(12) United States Patent
Taguchi et al.

(10) Patent No.: US 7,043,401 B2
(45) Date of Patent: May 9, 2006

(54) MULTIVARIATE DATA ANALYSIS METHOD AND USES THEREOF

(76) Inventors: Genichi Taguchi, 3260 Parkland Dr., West Bloomfield, MI (US) 48322; Rajesh Jugulum, 74 Donald St., Apt. 38, Weymouth, MA (US) 02188; Shin Taguchi, 3260 Parkland Dr., West Bloomfield, MI (US) 48322

( * ) Notice: Subject to any disclaimer, the term of this patent is extended or adjusted under 35 U.S.C. 154(b) by 58 days.

(21) Appl. No.: 10/774,024

(22) Filed: Feb. 6, 2004

(65) Prior Publication Data

US 2004/0215424 A1 Oct. 28, 2004

Related U.S. Application Data

(63) Continuation-in-part of application No. 10/293,092, filed on Nov. 13, 2002.

(60) Provisional application No. 60/338,574, filed on Nov. 13, 2001.

(51) Int. Cl.
*H03F 1/26* (2006.01)

(52) U.S. Cl. .................................................. 702/183

(58) Field of Classification Search ................ 702/183, 702/189, 111, 28; 700/48; 382/275, 228; 714/746; 341/50; 707/1; 706/26; 375/254; 324/71

See application file for complete search history.

(56) References Cited

U.S. PATENT DOCUMENTS 6,463,341 B1 * 10/2002 Cao et al. ..................... 700/48

* cited by examiner

Primary Examiner—Michael Nghiem
Assistant Examiner—Tung Lau
(74) Attorney, Agent, or Firm—Gifford, Krass, Groh, Sprinkle, Anderson & Citkowski, P.C.

(57) ABSTRACT

A process involves collecting data relating to a particular condition and parsing the data from an original set of variables into subsets. For each subset defined, Mahalanobis distances are computed for known normal and abnormal values and the square root of these Mahalanobis distances is computed. A multiple Mahalanobis distance is calculated based upon the square root of Mahalanobis distances. Signal to noise ratios are obtained for each run of an orthogonal array in order to identify important subsets. This process has applications in identifying important variables or combinations thereof from a large number of potential contributors to a condition. The multidimensional system is robust and performs predictive data analysis well even when there are incidences of multi-collinearity and variables with zero standard deviations in reference group or unit space. Separate methods are provided: adjoint matrix Gram-Schmidt's method for multi-collinearity problems, and modified Gram-Schmidt method for the cases where there are variables with zero standard deviation to achieve data analysis.

17 Claims, 6 Drawing Sheets

MULTIVARIATE DATA ANALYSIS METHOD AND USES THEREOF

RELATED APPLICATIONS

This application is a continuation-in-part of U.S. patent application Ser. No. 10/293,092 filed Nov. 13, 2002, which claims priority of U.S. Provisional Patent Application Ser. No. 60/338,574 filed Nov. 13, 2001. These applications are incorporated herein by reference.

BACKGROUND OF THE INVENTION

Design of a good information system based on several characteristics is an important requirement for successfully carrying out any decision-making activity. In many cases though a significant amount of information is available, we fail to use such information in a meaningful way. As we require high quality products in day-to-day life, it is also required to have high quality information systems to make robust decisions or predictions. To produce high quality products, it is well established that the variability in the processes must be reduced first. Variability can be accurately measured and reduced only if we have a suitable measurement system with appropriate measures. Similarly, in the design of information systems, it is essential to develop a measurement scale and use appropriate measures to make accurate predictions or decisions.

Usually, information systems deal with multidimensional characteristics. A multidimensional system could be an inspection system, a medical diagnosis system, a sensor system, a face/voice recognition system (any pattern recognition system), credit card/loan approval system, a weather forecasting system or a university admission system. As we encounter these multidimensional systems in day-to-day life, it is important to have a measurement scale by which degree of abnormality (severity) can be measured to take appropriate decisions. In the case of medical diagnosis, the degree of abnormality refers to the severity of diseases and in the case of credit card/loan approval system it refers to the ability to pay back the balance/loan. If we have a measurement scale based on the characteristics of multidimensional systems, it greatly enhances the decision maker's ability to take judicious decisions. While developing a multidimensional measurement scale, it is essential to keep in mind the following criteria: 1) having a base or reference point to the scale, 2) validation of the scale, and 3) selection of useful subset of variables with suitable measures for future use.

There are several multivariate methods. These methods are being used in multidimensional applications, but still there are incidences of false alarms in applications like weather forecasting, airbag sensor operation, and medical diagnosis. These problems could be because of not having an adequate measurement system with suitable measures to determine or predict the degree of severity accurately.

SUMMARY OF THE INVENTION

A process for multivariate data analysis includes the steps of using an adjoint matrix to compute a new distance for a data set in a Mahalanobis space. The relation of a datum relative to the Mahalanobis space is then determined.

A medical diagnosis process includes defining a set of variables relating to a patient condition and collecting a data set of the set of variables for a normal group. Standardized values of the set of variables of the normal group are then computed and used to construct a Mahalanobis space. A distance for an abnormal value outside the Mahalanobis space is then computed. Important variables from the set of variables are identified based on orthogonal arrays and signal to noise ratios. Subsequent monitoring of conditions occurs based upon the important variables.

DETAILED DESCRIPTION OF THE INVENTION

Figure 1:
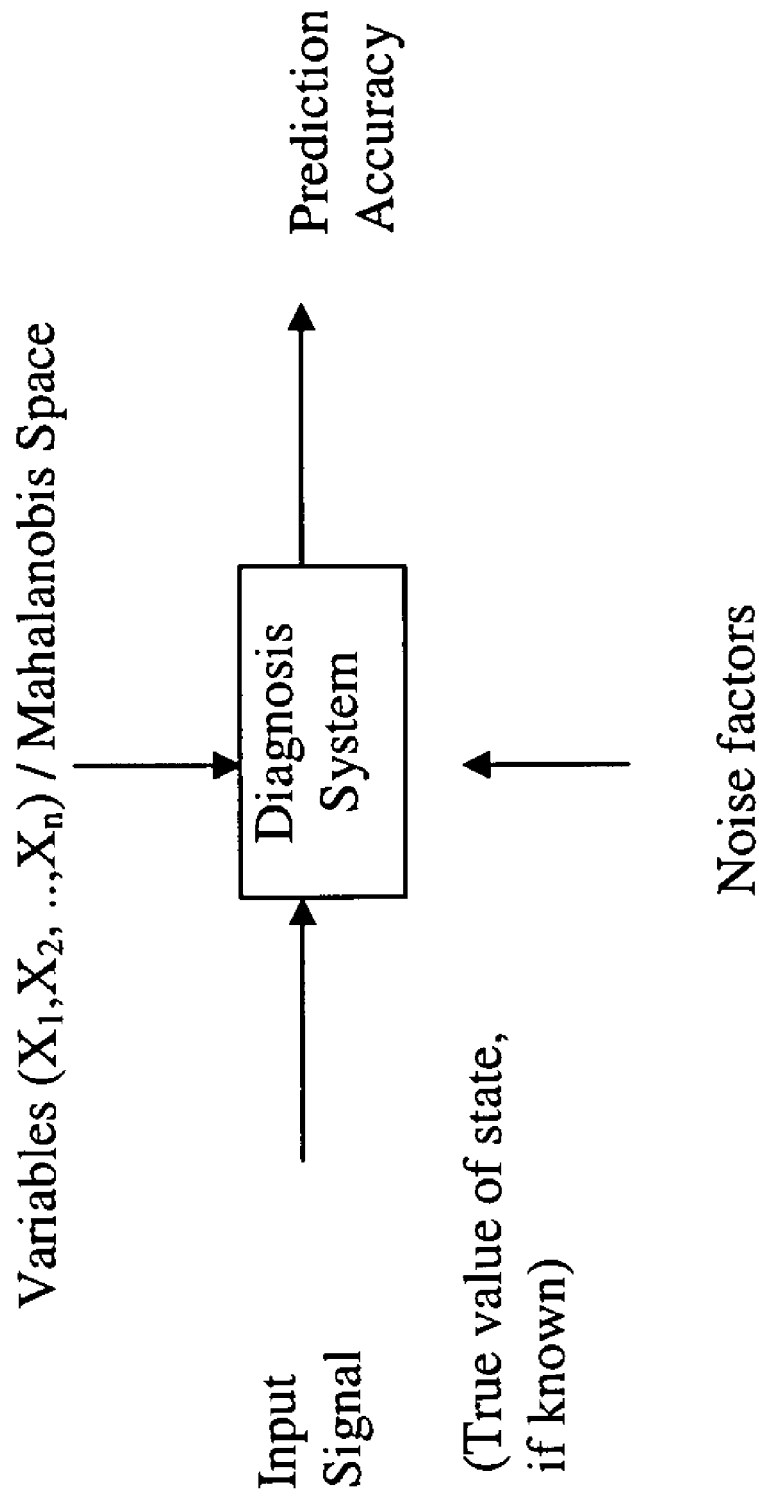
FIG. 1 is a schematic illustrating a multi-dimensional diagnosis system of the present invention.

The inventive method helps develop multidimensional measurement scale by integrating mathematical and statistical concepts such as Mahalanobis distance and Gram-Schmidt's orthogonalization method, with the principles of quality engineering or Taguchi Methods.

The selection of unit group (Mahalanobis group) is the most important aspect of MTS and its related methods. Every individual observation in this group has a unique pattern. Since the conditions of the observations are measured from this group, it is desirable that observations within this group be as uniform as possible. From this group, the distances (of observations outside of this group) are measured to perform the diagnosis. These distances, which are similar to the Mahalanobis distance, indicate the degree of severities of individual observations. A group of observations is needed (as in the case of the reference group) to measure distances because with one observation a correlation structure cannot be obtained. It should be noted that the correlation matrix corresponding to this reference group is also used to measure distances outside of this group. In MTS, S/N ratios are calculated based on the observations that are outside of the unit space.

In MTS and its related methods, the diagnosis is performed after validating the scale with variables defining the multidimensional system. The validation is done with observations outside of unit group by computing S/N ratios. S/N ratio is the measure of correlation between "input signal" and "output" of the system. If there is a good correlation (higher S/N ratio), then the scale is useful for diagnosis.

One of the main objectives of the present invention is to introduce a scale based on all input characteristics to measure the degree of abnormality. In the case of medical diagnosis, for example, the aim is to measure the degree of severity of each disease based on this scale. To construct such a scale, Mahalanobis distance (MD) is used. MD is a squared distance (also denoted as $D^2$) and is calculated for $j^{th}$ observation, in a sample of size n with k variables, by using the following formula:

$$MD_j = D_j^2 = (1/k)Z_{ij}C^{-1}Z'_{ij} \quad (1)$$

Where, j=1 to n $Z_{ij} = (z_{1j}, z_{2j}, \ldots, z_{kj})$ = standardized vector obtained by standardized values of $X_{ij}$ (i=1 ... k)

$Z_{ij} = (X_{ij} - m_i)/s_i$ $X_{ij}$ = value of $i^{th}$ characteristic in $j^{th}$ observation $m_i$ = mean of $i^{th}$ characteristic $s_i$ = s.d. of $i^{th}$ characteristic k = number of characteristics/variables ' = transpose of the vector $C^{-1}$ = inverse of the correlation matrix There is also an alternate way to compute MD values using Gram-Schmidt's orthogonalization process. It can be seen that MD in Equation (1) is obtained by scaling, that is by dividing with k, the original Mahalanobis distance. MD can be considered as the mean square deviation (MSD) in multidimensional spaces. The present invention focuses on constructing a normal group, or in the application of medical diagnosis a healthy group, from a data population, called Mahalanobis Space (MS). Defining the normal group or MS is the choice of a specialist conducting the data analysis. In case of medical diagnosis, the MS is constructed only for the people who are healthy and in case of manufacturing inspection system, the MS is constructed for high quality products. Thus, MS is a database for the normal group consisting of the following quantities:

$m_i$ = mean vector $s_i$ = standard deviation vector

C = correlation matrix.

Since MD values are used to define the normal group, this group is designated as the Mahalanobis Space. It can be easily shown, with standardized values, that MS has zero point as the mean vector and the average MD as unity. Because the average MD of MS is unity, MS is also called as the unit space. The zero point and the unit distance are used as reference point for the scale of normalcy relating to inclusion of a subject within MS. This scale is often operative in identifying the conditions outside the Mahalanobis Space. In order to validate the accuracy of the scale, different kinds of known conditions outside MS are used. If the scale is good, these conditions should have MDs that match with decision maker's judgment. In this application, the conditions outside MS are not considered as a separate group (population) because the occurrence of these conditions are unique, for example a patient may be abnormal because of high blood pressure or because of high sugar content. Because of this reason, the same correlation matrix of the MS is used to compute the MD values of each abnormal. MD of an abnormal point is the distance of that point from the center point of MS.

In the next phase of the invention, orthogonal arrays (OAs) and signal-to-noise (S/N) ratios are used to choose the relevant variables. There are different kinds of S/N ratios depending on the prior knowledge about the severity of the abnormals.

A typical multidimensional system used in the present invention is as shown in FIG. 1, where $X_1, X_2, \ldots, X_n$ correspond to the variables that provide a set of information to make a decision. Using these variables, MS is constructed for the healthy or normal group, which becomes the reference point for the measurement scale. After constructing the MS, the measurement scale is validated by considering the conditions outside MS. These outside conditions are typically checked with the given input signals and in the presence of noise factors (if any). If the noise factors are present, a correct decision has to be made about the state of the system. In the context of multivariate diagnosis system, it would be appropriate to consider two types of noise conditions. They are 1) active noise and 2) criminal noise. Example for active noise condition is change in usage environment such as conditions in different manufacturing environments or different hospitals and the example for criminal noise conditions are unexpected conditions such as terrorist attacks on 11 Sep. 2001 in which the system is operating. It is important to design multivariate information systems considering these two types of noise conditions. In FIG. 1, the input signal is the true value of the state of the system, if known. The output (MD) should have a good correlation with the true state of the system (input signal). In most applications, it is not easy to obtain the true states of the system. In such cases, the working averages of the different classes, where the classes correspond to the different degrees of severity, can be considered as the input signals.

After validating the measurement scale, OAs and S/N ratios are used to identify the variables of importance. OAs are used to minimize the number of variable combinations to be tested. The variables are allocated to the columns of the array. In MTS analysis only two level OAs are used as there are only two levels for the variables—presence and absence. To identify the variables of importance, S/N ratios are used.

The inventive process can illustratively be applied to a multidimensional system in four stages. The steps in each exemplary stage are listed below:

Stage I: Construction of a Measurement Scale with Mahalanobis Space (Unit Space) as the Reference Define the variables that determine the healthiness of a condition. For example, in medical diagnosis application, the doctor has to consider the variables of all diseases to define a healthy group. In general, for pattern recognition applications, the term "healthiness" must be defined with respect to "reference pattern".

Collect the data on all the variables from the healthy group.

Compute the standardized values of the variables of the healthy group.

Compute MDs of all observations. With these MDs, the zero point and the unit distance are defined.

Use the zero point and the unit distance as the reference point or base for the measurement scale.

Stage II: Validation of the Measurement Scale

Identify the abnormal conditions. In medical diagnosis applications, the abnormal conditions refer to the patients having different kinds of diseases. In fact, to validate the scale, any condition outside MS is chosen.

Compute the MDs corresponding to these abnormal conditions to validate the scale. The variables in the abnormal conditions are normalized by using the mean and s.d.s of the corresponding variables in the healthy group. The correlation matrix or set of Gram-Schmidt's coefficients, if Gram-Schmidt's method is used, corresponding to the healthy group is used for finding the MDs of abnormal conditions.

If the scale is good, the MDs corresponding to the abnormal conditions should have higher values. In this way the scale is validated. In other words, the MDs of conditions outside MS must match with judgment.

Stage III: Identify the Useful Variables (Developing Stage)
Find out the useful set of variables using orthogonal arrays (OAs) and S/N ratios. S/N ratio, obtained from the abnormal MDs, is used as the response for each combination of OA. The useful set of variables is obtained by evaluating the "gain" in S/N ratio.

Stage IV: Future Diagnosis with Useful Variables
Monitor the conditions using the scale, which is developed with the help of the useful set of variables. Based on the values of MDs, appropriate corrective actions can be taken. The decision to take the necessary actions depends on the value of the threshold.

In case of medical diagnosis application, above steps have to be performed for each kind of disease in the subsequent phases of diagnosis. It is appreciated that many additional applications for the present invention exist as illustratively recited in "The Mahalanobis Taguchi Strategy—A Pattern Technology System" by G. Taguchi and R. Jugulum, John-Wiley, 2002 and in "The Mahalanobis Taguchi System" by G. Taguchi et al., McGraw-Hill, 2001.

According to the present invention, an adjoint matrix method is used to calculate MD values.

If A is a square matrix, the inverse can be computed for square matrices only, then its inverse $A^{-1}$ is given as:

$$A^{-1} = (1/det.\ A)\ A_{adj} \quad (2)$$

Where, $A_{adj}$ is called adjoint matrix of A. Adjoint matrix is transpose of cofactor matrix, which is obtained by cofactors of all the elements of matrix A, det. A is called determinant of the matrix A. The determinant is a characteristic number (scalar) associated with a square matrix. A matrix is said to be singular if its determinant is zero.

As mentioned before, the determinant is a characteristic number associated with a square matrix. The importance of determinant can be realized when solving a system of linear equations using matrix algebra. The solution to the system of equations contains inverse matrix term, which is obtained by dividing the adjoint matrix by determinant. If the determinant is zero then, the solution does not exist.

Considering a 2×2 matrix as shown below:

$$A = \begin{bmatrix} a_{11} & a_{12} \\ a_{21} & a_{22} \end{bmatrix}$$

The determinant of this matrix is $a_{11} a_{22} - a_{12} a_{21}$.

Considering a 3×3 matrix as shown below:

$$A = \begin{bmatrix} a_{11} & a_{12} & a_{13} \\ a_{21} & a_{22} & a_{23} \\ a_{31} & a_{32} & a_{33} \end{bmatrix}$$

The determinant of A can be calculated as:

$$det.\ A = a_{11}A_{11} + a_{12}A_{12} + a_{13}A_{13}$$

Where, $A_{11}=(a_{22}a_{33}-a_{23}a_{32})$; $A_{12}=-(a_{21}a_{33}-a_{23}a_{31})$; $A_{13}=(a_{21}a_{32}-a_{22}a_{31})$ are called as cofactors of the elements $a_{11}, a_{12}$, and $a_{13}$ of matrix A respectively. Along a row or a column, the cofactors will have alternate plus and minus sign with the first cofactor having a positive sign.

The above equation is obtained by using the elements of the first row and the sub matrices obtained by deleting the rows and columns passing through these elements. The same value of determinant can be obtained by using other rows or any column of the matrix. In general, the determinant of a n×n square matrix can be written as:

det. $A = a_{i1}A_{i1} + a_{i2}A_{i2} + \ldots + a_{in}A_{in}$ along any row index i, where, i=1,2, . . . , n or det. $A = a_{1j}A_{1j} + a_{2j}A_{2j} + \ldots + a_{nj}A_{nj}$ along any column index j, where, j=1,2, . . . ,n Cofactor From the above discussion, it is clear that the cofactor of $A_{ij}$ of an element $a_{ij}$ is the factor remaining after the element $a_{ij}$ is factored out. The method of computing the co-factors is explained above for a 3×3 matrix. Along a row or a column the cofactors will have alternate signs of positive and negative with the first cofactor having a positive sign.

Adjoint Matrix of a Square Matrix

The adjoint of a square matrix A is obtained by replacing each element of A with its own cofactor and transposing the result.

Considering a 3×3 matrix as shown below:

$$A = \begin{bmatrix} a_{11} & a_{12} & a_{13} \\ a_{21} & a_{22} & a_{23} \\ a_{31} & a_{32} & a_{33} \end{bmatrix}$$

The cofactor matrix containing cofactors ($A_{ij}$s) of the elements of the above matrix can be written as:

$$A = \begin{bmatrix} a_{11} & a_{12} & a_{13} \\ a_{21} & a_{22} & a_{23} \\ a_{31} & a_{32} & a_{33} \end{bmatrix}$$

The adjoint of the matrix A, which is obtained by transposing the cofactor matrix, can be written as:

$$Adj.\ A = \begin{bmatrix} a_{11} & a_{12} & a_{13} \\ a_{21} & a_{22} & a_{23} \\ a_{31} & a_{32} & a_{33} \end{bmatrix}$$

Inverse Matrix

The inverse of matrix A (denoted as $A^{-1}$) can be obtained by dividing the elements of its adjoint by the determinant.

Singular and Non-Singular Matrices

If the determinant of a square matrix is zero then, it is called a singular matrix. Otherwise, the matrix is known as non-singular.

The present invention is applied to solve a number of longstanding data analysis problems. These are exemplified as follows.

Multi-collinearity Problems

Multi-collinearity problems arise out of strong correlations. When there are strong correlations, the determinant of correlation matrix tends to become zero thereby making the matrix singular. In such cases, the inverse matrix will be inaccurate or cannot be computed (because determinant term is in the denominator of Equation (2)). As a result, scaled MDs will also be inaccurate or cannot be computed. Such problems can be avoided if we use a matrix form, which is not affected by determinant term. From Equation (2), it is clear that adjoint matrix satisfies this requirement.

MD values in MTS method are computed by using inverse of the correlation matrix ($C^{-1}$, where C is correlation matrix). In the present invention, the adjoint matrix is used to calculate the distances. If MDA denotes the distances obtained from adjoint matrix method, then equation for MDA can be written as:

$$MDA_j = (1/k) Z_{ij} C_{adj} Z_{ij}' \quad (3)$$

Where, j=1 to n $Z_{ij} = (z_{1j}, Z_{2j}, \ldots, Z_{kj})$ =standardized vector obtained by standardized values of $X_{ij}$ (i=1 . . . k)

$Z_{ij} = (X_{ij} - m_i)/s_i$;

$X_{ij}$ =value of $i^{th}$ characteristic in $j^{th}$ observation $m_i$ =mean of $i^{th}$ characteristic $s_i$ =s.d. of $i^{th}$ characteristic k=number of characteristics/variables '=transpose of the vector $C_{adj}$ =adjoint of the correlation matrix.

The relationship between the conventional MD and the MDAs in Equation (3) can be written as:

$$MD_j = (1/det.C) MDA_j \quad (4)$$

Thus, an MDA value is similar to a MD value with different properties, that is, the average MDA is not unity. Like in the case of MD values, MDA values represent the distances from the normal group and can be used to measure the degree of abnormalities. In adjoint matrix method also, the Mahalanobis space contains means, standard deviations and correlation structure of the normal or healthy group. Here, the Mahalanobis space cannot be called as unit space since the average of MDAs is not unity.

β-adjustment Method

The present invention has applications in multivariate analysis in the presence of small correlation coefficients in correlation matrix. When there are small correlation coefficients, the adjustment factor β is calculated as follows.

$$\beta = 0 \text{ if } r \leq 1/\sqrt{n} \quad (5)$$

$$\beta = 1 - \frac{1}{n-1}\left(\frac{1}{r^2} - 1\right) \text{ if } r > 1/\sqrt{n}$$

where r is correlation coefficient and n is sample size.

After computing β, the elements of the correlation matrix are adjusted by multiplying them with β. This adjusted matrix is used to carry out MTS analysis or analysis with adjoint matrix.

To explain the applicability of β-adjustment method, Dr. Kanetaka's data on liver disease testing is used. The data contains observations of healthy group as well as of the conditions outside Mahalanobis space (MS). The healthy group (MS) is constructed based on observations on 200 people, who do not have any health problems. There are 17 abnormal conditions. This example is chosen since the correlation matrix in this case contains a few small correlation coefficients. The corresponding β-adjusted correlation matrix (using Equation (5)) is as shown in Table 1.

TABLE 1

β-adjusted correlation matrix

| | $X_1$ | X2 | $X_3$ | X4 | $X_5$ | X6 | $X_7$ | X8 | $X_9$ |
|---|---|---|---|---|---|---|---|---|---|
| $X_1$ | 1.000 | −0.281 | −0.261 | −0.392 | −0.199 | 0.052 | 0.000 | 0.185 | 0.277 |
| $X_2$ | −0.281 | 1.000 | 0.055 | 0.406 | 0.687 | 0.271 | 0.368 | −0.061 | 0.000 |
| $X_3$ | −0.261 | 0.055 | 1.000 | 0.417 | 0.178 | 0.024 | 0.103 | 0.002 | 0.000 |
| $X_4$ | −0.392 | 0.406 | 0.417 | 1.000 | 0.301 | 0.000 | 0.000 | 0.000 | −0.059 |
| $X_5$ | −0.199 | 0.687 | 0.178 | 0.301 | 1.000 | 0.332 | 0.374 | 0.000 | 0.000 |
| $X_6$ | 0.052 | 0.271 | 0.024 | 0.000 | 0.332 | 1.000 | 0.788 | 0.301 | 0.149 |
| $X_7$ | 0.000 | 0.368 | 0.103 | 0.000 | 0.374 | 0.788 | 1.000 | 0.109 | 0.000 |
| $X_8$ | 0.185 | −0.061 | 0.002 | 0.000 | 0.000 | 0.301 | 0.109 | 1.000 | 0.208 |
| $X_9$ | 0.277 | 0.000 | 0.000 | −0.059 | 0.000 | 0.149 | 0.000 | 0.208 | 1.000 |
| $X_{10}$ | −0.056 | 0.643 | 0.149 | 0.252 | 0.572 | 0.544 | 0.562 | 0.090 | 0.000 |
| $X_{11}$ | −0.067 | 0.384 | 0.155 | 0.197 | 0.419 | 0.528 | 0.500 | 0.206 | 0.113 |
| $X_{12}$ | 0.247 | −0.217 | 0.000 | −0.100 | 0.000 | 0.115 | 0.097 | 0.231 | 0.143 |
| $X_{13}$ | 0.099 | 0.252 | 0.127 | 0.050 | 0.355 | 0.305 | 0.362 | 0.054 | 0.080 |
| $X_{14}$ | 0.267 | −0.201 | 0.014 | −0.099 | 0.000 | 0.139 | 0.115 | 0.238 | 0.139 |
| $X_{15}$ | −0.276 | 0.885 | 0.117 | 0.353 | 0.640 | 0.307 | 0.387 | 0.000 | −0.007 |
| $X_{16}$ | 0.000 | 0.236 | −0.078 | 0.036 | 0.099 | 0.154 | 0.064 | 0.043 | −0.044 |
| $X_{17}$ | −0.265 | 0.796 | 0.173 | 0.403 | 0.671 | 0.347 | 0.425 | 0.000 | 0.000 |

| | X10 | $X_{11}$ | X12 | $X_{13}$ | X14 | $X_{15}$ | X16 | $X_{17}$ |
|---|---|---|---|---|---|---|---|---|
| $X_1$ | −0.056 | −0.067 | 0.247 | 0.099 | 0.267 | −0.276 | 0.000 | −0.265 |
| $X_2$ | 0.643 | 0.384 | −0.217 | 0.252 | −0.201 | 0.885 | 0.236 | 0.796 |
| $X_3$ | 0.149 | 0.155 | 0.000 | 0.127 | 0.014 | 0.117 | −0.078 | 0.173 |
| $X_4$ | 0.252 | 0.197 | −0.100 | 0.050 | −0.099 | 0.353 | 0.036 | 0.403 |
| $X_5$ | 0.572 | 0.419 | 0.000 | 0.355 | 0.000 | 0.640 | 0.099 | 0.671 |
| $X_6$ | 0.544 | 0.528 | 0.115 | 0.305 | 0.139 | 0.307 | 0.154 | 0.347 |
| $X_7$ | 0.562 | 0.500 | 0.097 | 0.362 | 0.115 | 0.387 | 0.064 | 0.425 |
| $X_8$ | 0.090 | 0.206 | 0.231 | 0.054 | 0.238 | 0.000 | 0.043 | 0.000 |
| $X_9$ | 0.000 | 0.113 | 0.143 | 0.080 | 0.139 | −0.007 | −0.044 | 0.000 |
| $X_{10}$ | 1.000 | 0.679 | 0.000 | 0.427 | 0.016 | 0.607 | 0.103 | 0.645 |
| $X_{11}$ | 0.679 | 1.000 | 0.128 | 0.329 | 0.120 | 0.436 | 0.000 | 0.457 |
| $X_{12}$ | 0.000 | 0.128 | 1.000 | 0.296 | 0.966 | −0.105 | 0.000 | 0.000 |

TABLE 1-continued

| | β-adjusted correlation matrix | | | | | | | |
|---|---|---|---|---|---|---|---|---|
| $X_{13}$ | 0.427 | 0.329 | 0.296 | 1.000 | 0.304 | 0.249 | 0.000 | 0.339 |
| $X_{14}$ | 0.016 | 0.120 | 0.966 | 0.304 | 1.000 | −0.077 | 0.000 | 0.000 |
| $X_{15}$ | 0.607 | 0.436 | −0.105 | 0.249 | −0.077 | 1.000 | 0.262 | 0.768 |
| $X_{16}$ | 0.103 | 0.000 | 0.000 | 0.000 | 0.000 | 0.262 | 1.000 | 0.149 |
| $X_{17}$ | 0.645 | 0.457 | 0.000 | 0.339 | 0.000 | 0.768 | 0.149 | 1.000 |

With this matrix, MTS analysis is carried out with dynamic S/N ratio analysis and as a result the following useful variable combination was obtained: $X_4$-$X_5$- $X_7$-$X_{10}$-$X_{12}$-$X_{13}$-$X_{14}$-$X_{15}$-$X_{16}$-$X_{17}$ This combination is very similar to the useful variable set obtained without β-adjustment; the only difference is presence of variables $X_7$ and $X_{16}$.

With this useful variable set, S/N ratio analysis is carried out to measure improvement in overall system performance. From the Table 2, which shows system performance in the form of S/N ratios, it is clear that there is a gain of 0.91 dB units if useful variables are used instead of entire set of variables.

TABLE 2

| S/N Ratio Analysis (β-adjustment method) | |
|---|---|
| S/N ratio-optimal system | 43.81 dB |
| S/N ratio-original system | 42.90 dB |
| Gain | 0.91 dB |

In an alternate embodiment of the present invention, a Mahalanobis distance is computed using a Gram-Schmidt orthogonalization process (GSP). GSP is often a more robust and sample size insensitive orthogonalization process. Like in MTS, using the inventive MTGS method, the coefficients of orthogonal expansion of unit group are also used to predict the conditions outside this group. The usefulness of this space is tested with signal to noise ratios, like control factors are tested in hardware design. According to the Gram-Schmidt process, original variables are converted to orthogonal and independent variables. The Gram-Schmidt orthogonalization process is particularly well suited to identify the direction of abnormals. While measuring the degree of abnormality of a given value, a longer distance corresponds to higher degree of severity. In some instances, such as stock performance or financial market predictions, longer distance can represent favorable situations if the normal space is constructed based on companies with average performance. In such an instance, both underperforming and outperforming companies will have longer distances. Distinguishment of these diametrically abnormal situations is preferably performed with the Gram-Schmidt orthogonalization process (GSP).

The GSP operates on a set of given linearly independent vectors $Z_1, Z_2, \ldots Z_k$, to determine a corresponding set of mutually perpendicular vectors $U_1, U_2, \ldots U_k$ with the same linear span as shown in Equation (6).

(6)

The Gram-Schmidt's vectors are constructed sequentially by setting up Equations (7).

$U_1 = Z$.

$U_2 = Z_2 - ((Z'_2 U_1)/(U'_1 U_1)) U_1$ $U_k = Z_k - ((Z'_k U_1)/(U'_1 U_1)) U_1 - \ldots - ((Z'_k U_{k-1})/(U'_{k-1} U_{k-1})) U_{k-1}$ (7)

Where, ' denotes a vector transpose. While calculating MD using GSP, standardized values of the variables are used. Therefore, in the above set of Equations (7), $Z_1, Z_2, \ldots Z_k$ correspond to standardized values.

Calculation of MD Using Gram-Schmidt Process (GSP)

Beginning with a sample of size n, where each sample contains observations on k variables. After standardizing the variables, a set of standardized vectors is obtained. Let these vectors be:

$Z_1 = (z_{11}, z_{12}, \ldots, z_{1n})$ $Z_2 = (z_{21}, z_{22}, \ldots, z_{2n})$ $Z_k = (z_{k1}, z_{k2}, \ldots, z_{kn})$ (8)

After performing GSP, the orthogonal vectors are as follows:

$U_1 = (u_{11}, u_{12}, \ldots, u_{1n})$ $U_2 = (u_{21}, u_{22}, \ldots, u_{2n})$ $U_k = (u_{k1}, u_{k2}, \ldots, u_{kn})$ (9)

It is easily shown that mean of vectors $U_1, U_2, \ldots, U_k$ is zero. Let $s_1, s_2, \ldots s_k$ be standard deviations (s.d.s) of $U_1, U_2, \ldots, U_k$ respectively. Since the sample of size is n, there are n different MDs. MD corresponding to $j^{th}$ observation of the sample is computed using Equation (10).

$MD_j = (1/k) [(u_{1j}^2/s_1^2) + (u_{2j}^2/s_2^2) + \ldots + (u_{kj}^2/s_k^2)]$ (10)

Where, $j = 1 \ldots n$, the values of MD obtained from Equations (1) and (10) are exactly the same. In MTGS methodology, abnormal MDs are computed from the means, standard deviations and Gram-Schmidt coefficients of the normal group or Mahalanobis space, while the Mahalanobis space is a database including means, standard deviations, Gram-Schmidt coefficients and the Mahalanobis distances.

Predictions Based on Gram-Schmidt Variables

According to the present invention, a method of making predictions using Gram-Schmidt (GS) variables without calculating the Mahalanobis distance is provided. This method is useful in situations where the reference group consists of the variables with small or even zero standard deviation or variance. In the most extreme case where if variables have zero standard deviations then correlations with other variables are not possible and hence calculation of Mahalanobis distances is not possible, although variables with zero standard deviations represent very important patterns. This type of situation is frequently seen in pattern recognition problems.

The method of making predictions according to one embodiment of the present invention is described in the following steps:

1) Subtract mean vector from all observations in the normal group. Let $X_1, X_2, \ldots, X_k$ denote original vectors and $L_1, L_2, \ldots, L_k$ denote the vectors that are obtained after subtracting the mean vector.

2) Conduct GSP on $L_1, L_2, \ldots, L_k$. If some variables have zero variance or synonymously, zero standard deviation then these variables will be zeroes after subtracting original values from respective means. In such situations these zero vectors also are used as GS vectors because, they will be orthogonal to any other vector. Let $U_1, U_2, \ldots, U_k$ denote Gram-Schmidt vectors corresponding to $L_1, L_2, \ldots, L_k$. Here, the reference group consists of means and coefficients of Gram-Schmidt vectors.

3) Obtain Gram-Schmidt vectors corresponding to the observations outside the reference group by using means and Gram-Schmidt coefficients of the reference group.

4) Compute dynamic S/N ratios for Gram-Schmidt variables ($U_1, U_2, \ldots, U_k$) using values of severity of the conditions (observations) as input signals. The severity of conditions can be actual values or optionally, assigned values. The procedure for computing S/N ratios is as follows:

If $M_1, M_2, \ldots, M_t$ represent the true levels of severity (input signals) corresponding to t abnormals, the relationship between the input signal ($M_i$s) and the $j^{th}$ variable ($U_{ij}$s) is given by the following equation:

$$U_{ij} = \beta_j M_i, i=1, \ldots, t; j=1 \ldots k \quad (11)$$

and $\beta_j$ is the linear slope of relation between $U_{ij}$ and $M_i$
Then calculate following quantities, $$S_T = \text{Total Sum of Squares} = \sum_{i=1}^{t} U_{ij}^2$$

$$r = \text{Sum of squares due to input signal} = \sum_{i=1}^{t} M_i^2$$

$$S_\beta = \text{Sum of Squares due to Slope} = (1/r)\left[\sum_{i=1}^{t} M_i U_{ij}\right]^2$$

$S_e$=Error Sum of Squares=$S_T - S_\beta$
$V_e$=Error Variance=$S_e/(t-1)$
The linear slope, $\beta_j$, for $j^{th}$ variable is given by:

$$\beta_j = \left[\sum_{i=1}^{t} M_i U_{ij}\right]/r \quad (12)$$

The S/N ratio, $\eta_j$, corresponding $j^{th}$ variable is given by, $$\eta_j = \beta_j^2/V_e \quad (13)$$

5) After computing $\eta_j$ and $\beta_j$ for each Gram-Schmidt variable calculate predicted values of abnormals. The predicted value of $i^{th}$ abnormal condition is obtained as follows:

$$Y_i = \frac{\sum_{j=1}^{k}\left(\frac{\eta_j U_{ij}}{\beta_j}\right)}{\sum_{j=1}^{k} \eta_j} \quad (14)$$

where, $i=1, \ldots, t$ and $U_{ij}$ is Gram-Schmidt element corresponding to $j^{th}$ variable in $i^{th}$ condition.

6) If there is a good correlation between the predicted values and actual values then Equation (14) is useful for future predictions. Again here, we can use S/N ratio to examine the accuracy of the prediction, that is, the correlation between predicted values and actual values.

Multiple Mahalanobis Distance

Selection of suitable subsets is very important in multivariate diagnosis/pattern recognition activities as it is difficult to handle large datasets with several numbers of variables. The present invention applies a new metric called Multiple Mahalanobis Distance (MMD) for computing S/N ratios to select suitable subsets. This method is useful in complex situations, illustratively including voice recognition or TV picture recognition. In these cases, the number of variables runs into the order of several thousands. Use of MMD method helps in reducing the problem complexity and to make effective decisions in complex situations.

Figure 2:
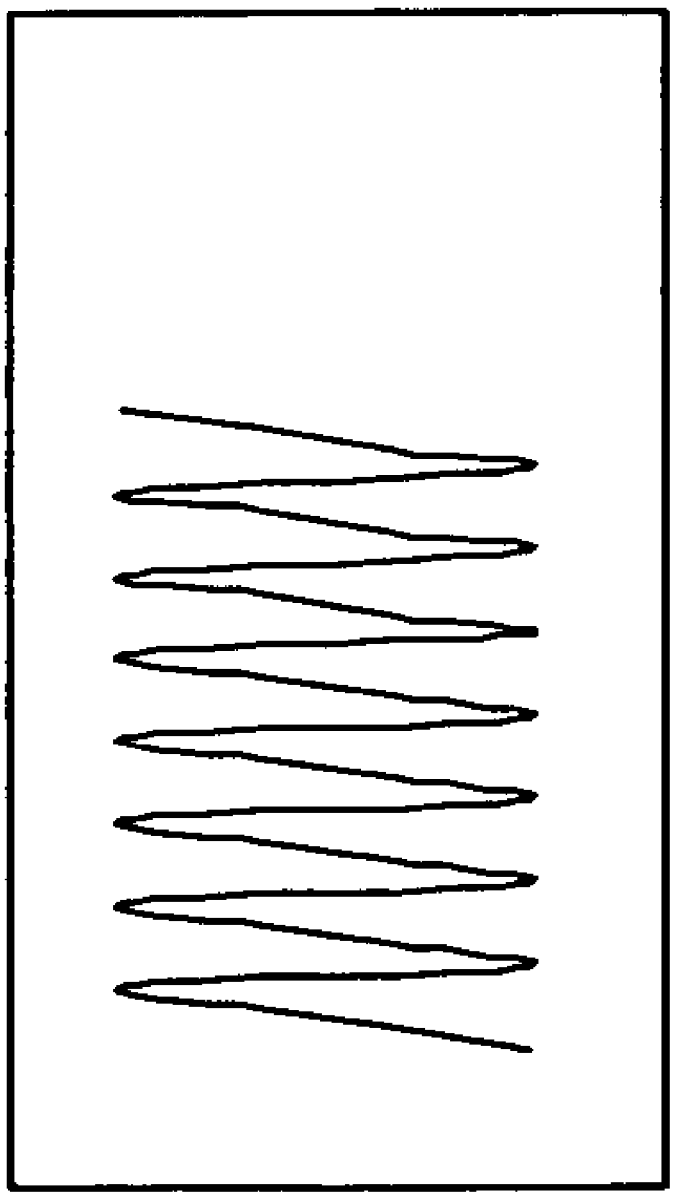
FIG. 2 is a graphical representation of a voice recognition pattern according to the present invention parsed into the letter k subsets that correspond to k patterns numbered from 1,2, . . . k where each pattern starts at a low value, reaches a maximum and then again returns to the low value.

In MMD method, large number of variables is divided into several subsets containing local variables. For example, in a voice recognition pattern (as shown in FIG. 2), let there be k subsets. The subsets correspond to k patterns numbered from 1, 2, . . . k. Each pattern starts at a low value, reaches a maximum and then again returns to the low value. These patterns (subsets) are described by a set of respective local variables. In MMD method, for each subset the Mahalanobis distances are calculated. These Mahalanobis distances are used to calculate MMD. Using abnormal MMDs, S/N ratios are calculated to determine useful subsets. In this way the complexity of the problems is reduced.

This method is also useful for identifying the subsets (or variables in the subsets) corresponding to different failure modes or patterns that are responsible for higher values of MDs. For example in the case of final product inspection system, use of MMD method would help to find out variables corresponding to different processes that are responsible for product failure.

If the variables corresponding to different subsets or processes cannot be identified then, decision-maker can select subsets from the original set of variables and identify the best subsets required.

Exemplary Steps in Inventive Process

1. Define subsets from original set of variables. The subsets may contain variables corresponding to different patterns or failure modes. These variables can also be based on decision maker's discretion. The number of variables in the subsets need not be the same.
2. For each subset, calculate MDs (for normals and abnormals) using respective variables in them.
3. Compute square root of these MDs ($\sqrt{\text{MDs}}$).
4. Consider the subsets as variables (control factors). The $\sqrt{\text{MDs}}$ would provide required data for these subsets. If there are k subsets then, the problem is similar to MTS problem with k variables. The number of normals and abnormals will be same as in the original problem. The analysis with $\sqrt{\text{MDs}}$ is exactly similar to that of MTS method with original variables. The new Mahalanobis distance obtained based on square root of MDs is referred to as Multiple Mahalanobis Distance (MMD).

5. With the MMDs, S/N ratios are obtained for each run of an orthogonal array. Based on gains in S/N ratios, the important subsets are selected.

EXAMPLE 1

The adjoint matrix method is applied to liver disease test data considered earlier. For the purpose of better understanding of the discussion, correlation matrix, inverse matrix and adjoint matrix corresponding to the 17 variables are given in Tables 3, 4, and 5 respectively. In this case the determinant of the correlation matrix is 0.00001314.

The Mahalanobis distances calculated by inverse matrix method and adjoint matrix method (MDAs), are given in Table 6 (for normal group) and in Table 7 (for abnormal group). From the Table 6, it is clear that the average MDAs for normals do not converge to 1.0. MDAs and MDs are related according to the Equation (4).

TABLE 3

Correlation matrix

|     | X1     | X2     | X3     | X4     | X5     | X6    | X7    | X8     | X9     |
|-----|--------|--------|--------|--------|--------|-------|-------|--------|--------|
| X1  | 1.000  | -0.297 | -0.278 | -0.403 | -0.220 | 0.101 | 0.041 | 0.208  | 0.293  |
| X2  | -0.297 | 1.000  | 0.103  | 0.416  | 0.690  | 0.287 | 0.379 | -0.108 | -0.048 |
| X3  | -0.278 | 0.103  | 1.000  | 0.427  | 0.202  | 0.084 | 0.139 | 0.072  | 0.011  |
| X4  | -0.403 | 0.416  | 0.427  | 1.000  | 0.315  | 0.038 | 0.056 | 0.010  | -0.106 |
| X5  | -0.220 | 0.690  | 0.202  | 0.315  | 1.000  | 0.345 | 0.385 | 0.063  | -0.057 |
| X6  | 0.101  | 0.287  | 0.084  | 0.038  | 0.345  | 1.000 | 0.790 | 0.316  | 0.177  |
| X7  | 0.041  | 0.379  | 0.139  | 0.056  | 0.385  | 0.790 | 1.000 | 0.143  | 0.068  |
| X8  | 0.208  | -0.108 | 0.072  | 0.010  | 0.063  | 0.316 | 0.143 | 1.000  | 0.229  |
| X9  | 0.293  | -0.048 | 0.011  | -0.106 | -0.057 | 0.177 | 0.068 | 0.229  | 1.000  |
| X10 | -0.104 | 0.647  | 0.177  | 0.269  | 0.578  | 0.550 | 0.568 | 0.129  | 0.065  |
| X11 | -0.112 | 0.395  | 0.182  | 0.219  | 0.429  | 0.535 | 0.507 | 0.227  | 0.147  |
| X12 | 0.264  | -0.237 | 0.070  | -0.136 | 0.012  | 0.148 | 0.134 | 0.250  | 0.171  |
| X13 | 0.135  | 0.269  | 0.158  | 0.100  | 0.367  | 0.320 | 0.373 | 0.103  | 0.121  |
| X14 | 0.283  | -0.222 | 0.078  | -0.135 | 0.032  | 0.168 | 0.148 | 0.257  | 0.168  |
| X15 | -0.292 | 0.886  | 0.150  | 0.365  | 0.644  | 0.321 | 0.398 | -0.063 | -0.075 |
| X16 | -0.019 | 0.254  | -0.119 | 0.091  | 0.135  | 0.181 | 0.109 | 0.095  | -0.096 |
| X17 | -0.282 | 0.798  | 0.198  | 0.413  | 0.675  | 0.359 | 0.435 | -0.015 | -0.061 |

|     | X10    | X11    | X12    | X13    | X14    | X15    | X16    | X17    |
|-----|--------|--------|--------|--------|--------|--------|--------|--------|
| X1  | -0.104 | -0.112 | 0.264  | 0.135  | 0.283  | -0.292 | -0.019 | -0.282 |
| X2  | 0.647  | 0.395  | -0.237 | 0.269  | -0.222 | 0.886  | 0.254  | 0.798  |
| X3  | 0.177  | 0.182  | 0.070  | 0.158  | 0.078  | 0.150  | -0.119 | 0.198  |
| X4  | 0.269  | 0.219  | -0.136 | 0.100  | -0.135 | 0.365  | 0.091  | 0.413  |
| X5  | 0.578  | 0.429  | 0.012  | 0.367  | 0.032  | 0.644  | 0.135  | 0.675  |
| X6  | 0.550  | 0.535  | 0.148  | 0.320  | 0.168  | 0.321  | 0.181  | 0.359  |
| X7  | 0.568  | 0.507  | 0.134  | 0.373  | 0.148  | 0.398  | 0.109  | 0.435  |
| X8  | 0.129  | 0.227  | 0.250  | 0.103  | 0.257  | -0.063 | 0.095  | -0.015 |
| X9  | 0.065  | 0.147  | 0.171  | 0.121  | 0.168  | -0.075 | -0.096 | -0.061 |
| X10 | 1.000  | 0.683  | 0.052  | 0.437  | 0.079  | 0.612  | 0.138  | 0.649  |
| X11 | 0.683  | 1.000  | 0.159  | 0.342  | 0.152  | 0.445  | 0.048  | 0.465  |
| X12 | 0.052  | 0.159  | 1.000  | 0.310  | 0.967  | -0.140 | -0.004 | -0.023 |
| X13 | 0.437  | 0.342  | 0.310  | 1.000  | 0.318  | 0.267  | -0.041 | 0.352  |
| X14 | 0.079  | 0.152  | 0.967  | 0.318  | 1.000  | -0.119 | 0.025  | -0.011 |
| X15 | 0.612  | 0.445  | -0.140 | 0.267  | -0.119 | 1.000  | 0.279  | 0.771  |
| X16 | 0.138  | 0.048  | -0.004 | -0.041 | 0.025  | 0.279  | 1.000  | 0.177  |
| X17 | 0.649  | 0.465  | -0.023 | 0.352  | -0.011 | 0.771  | 0.177  | 1.000  |

TABLE 4

Inverse matrix

|     | X1     | X2     | X3     | X4     | X5     | X6     | X7     | X8     | X9     |
|-----|--------|--------|--------|--------|--------|--------|--------|--------|--------|
| X1  | 1.592  | -0.003 | 0.307  | 0.297  | 0.118  | -0.082 | -0.116 | -0.193 | -0.304 |
| X2  | -0.003 | 8.136  | 0.658  | -0.706 | -1.281 | 0.627  | -0.439 | 0.379  | -0.576 |
| X3  | 0.307  | 0.658  | 1.442  | -0.594 | -0.169 | 0.136  | -0.258 | -0.066 | -0.123 |
| X4  | 0.297  | -0.706 | -0.594 | 1.677  | 0.101  | 0.009  | 0.272  | -0.143 | 0.088  |
| X5  | 0.118  | -1.281 | -0.169 | 0.101  | 2.357  | -0.197 | 0.110  | -0.193 | 0.200  |
| X6  | -0.082 | 0.627  | 0.136  | 0.009  | -0.197 | 3.403  | -2.266 | -0.483 | -0.297 |
| X7  | -0.116 | -0.439 | -0.258 | 0.272  | 0.110  | -2.266 | 3.192  | 0.275  | 0.252  |
| X8  | -0.193 | 0.379  | -0.066 | -0.143 | -0.193 | -0.483 | 0.275  | 1.338  | -0.157 |
| X9  | -0.304 | -0.576 | -0.123 | 0.088  | 0.200  | -0.297 | 0.252  | -0.157 | 1.247  |
| X10 | -0.113 | -1.482 | -0.115 | 0.071  | -0.034 | -0.436 | -0.172 | -0.056 | 0.101  |
| X11 | 0.248  | 0.748  | 0.070  | -0.157 | -0.121 | -0.348 | -0.133 | -0.179 | -0.218 |
| X12 | 0.337  | -0.192 | 0.223  | 0.026  | 0.210  | 0.332  | -0.240 | -0.103 | -0.118 |
| X13 | -0.284 | -0.077 | -0.097 | -0.049 | -0.235 | 0.044  | -0.195 | 0.064  | -0.034 |
| X14 | -0.552 | 1.358  | -0.304 | 0.055  | -0.440 | -0.156 | 0.106  | -0.028 | -0.006 |

TABLE 4-continued

Inverse matrix

|     |        |        |        |        |        |        |        |        |        |
|-----|--------|--------|--------|--------|--------|--------|--------|--------|--------|
| X15 | 0.146  | -4.277 | -0.315 | 0.317  | 0.077  | -0.108 | -0.009 | 0.022  | 0.240  |
| X16 | -0.028 | -0.316 | 0.194  | -0.103 | 0.108  | -0.338 | 0.147  | -0.143 | 0.157  |
| X17 | 0.198  | -1.525 | -0.023 | -0.296 | -0.429 | -0.104 | -0.153 | 0.012  | 0.131  |

|     | X10    | X11    | X12     | X13    | X14     | X15    | X16    | X17    |
|-----|--------|--------|---------|--------|---------|--------|--------|--------|
| X1  | -0.113 | 0.248  | 0.337   | -0.284 | -0.552  | 0.146  | -0.028 | 0.198  |
| X2  | -1.482 | 0.748  | -0.192  | -0.077 | 1.358   | -4.277 | -0.316 | -1.525 |
| X3  | -0.115 | 0.070  | 0.223   | -0.097 | -0.304  | -0.315 | 0.194  | -0.023 |
| X4  | 0.071  | -0.157 | 0.026   | -0.049 | 0.055   | 0.317  | -0.103 | -0.296 |
| X5  | -0.034 | -0.121 | 0.210   | -0.235 | -0.440  | 0.077  | 0.108  | -0.429 |
| X6  | -0.436 | -0.348 | 0.332   | 0.044  | -0.156  | -0.108 | -0.338 | -0.104 |
| X7  | -0.172 | -0.133 | -0.240  | -0.195 | 0.106   | -0.009 | 0.147  | -0.153 |
| X8  | -0.056 | -0.179 | -0.103  | 0.064  | -0.028  | 0.022  | -0.143 | 0.012  |
| X9  | 0.101  | -0.218 | -0.118  | -0.034 | -0.006  | 0.240  | 0.157  | 0.131  |
| X10 | 3.321  | -1.247 | 0.928   | -0.335 | -1.004  | 0.386  | 0.041  | -0.350 |
| X11 | -1.247 | 2.302  | -0.880  | -0.001 | 0.754   | -0.637 | 0.151  | -0.036 |
| X12 | 0.928  | -0.880 | 16.234  | -0.293 | -15.614 | 0.589  | 0.274  | -0.363 |
| X13 | -0.335 | -0.001 | -0.293  | 1.537  | -0.096  | 0.043  | 0.167  | -0.145 |
| X14 | -1.004 | 0.754  | -15.614 | -0.096 | 16.526  | -0.826 | -0.463 | -0.018 |
| X15 | 0.386  | -0.637 | 0.589   | 0.043  | -0.826  | 5.415  | -0.330 | -0.691 |
| X16 | 0.041  | 0.151  | 0.274   | 0.167  | -0.463  | -0.330 | 1.249  | 0.120  |
| X17 | -0.350 | -0.036 | -0.363  | -0.145 | -0.018  | -0.691 | 0.120  | 3.599  |

TABLE 5

Adjoint matrix

|          | $X_1$    | $X_2$    | $X_3$    | $X_4$    | $X_5$    | $X_6$    | $X_7$    | $X_8$    | $X_9$    |
|----------|----------|----------|----------|----------|----------|----------|----------|----------|----------|
| $X_1$    | 2.09E-05 | -3.8E-08 | 4.03E-06 | 3.9E-06  | 1.55E-06 | -1.07E-06| -1.52E-06| -2.53E-06| -4E-06   |
| $X_2$    | -3.8E-08 | 0.000107 | 8.65E-06 | -9.27E-06| -1.68E-05| 8.24E-06 | -5.77E-06| 4.98E-06 | -7.57E-06|
| $X_3$    | 4.03E-06 | 8.65E-06 | 1.89E-05 | -7.81E-06| -2.22E-06| 1.78E-06 | -3.4E-06 | -8.65E-07| -1.62E-06|
| $X_4$    | 3.9E-06  | -9.27E-06| -7.81E-06| 2.2E-05  | 1.33E-06 | 1.18E-07 | 3.57E-06 | -1.88E-06| 1.16E-06 |
| $X_5$    | 1.55E-06 | -1.68E-05| -2.22E-06| 1.33E-06 | 3.1E-05  | -2.59E-06| 1.44E-06 | -2.54E-06| 2.63E-06 |
| $X_6$    | -1.07E-06| 8.24E-06 | 1.78E-06 | 1.18E-07 | -2.59E-06| 4.47E-05 | -2.98E-05| -6.35E-06| -3.91E-06|
| $X_7$    | -1.52E-06| -5.77E-06| -3.4E-06 | 3.57E-06 | 1.44E-06 | -2.98E-05| 4.19E-05 | 3.61E-06 | 3.31E-06 |
| $X_8$    | -2.53E-06| 4.98E-06 | -8.65E-07| -1.88E-06| -2.54E-06| -6.35E-06| 3.61E-06 | 1.76E-05 | -2.07E-06|
| $X_9$    | -4E-06   | -7.57E-06| -1.62E-06| 1.16E-06 | 2.63E-06 | -3.91E-06| 3.31E-06 | -2.07E-06| 1.64E-05 |
| $X_{10}$ | -1.49E-06| -1.95E-05| -1.51E-06| 9.35E-07 | -4.5E-07 | -5.74E-06| -2.26E-06| -7.31E-07| 1.32E-06 |
| $X_{11}$ | 3.26E-06 | 9.83E-06 | 9.22E-07 | -2.06E-06| -1.6E-06 | -4.57E-06| -1.75E-06| -2.35E-06| -2.86E-06|
| $X_{12}$ | 4.43E-06 | -2.53E-06| 2.93E-06 | 3.41E-07 | 2.77E-06 | 4.36E-06 | -3.16E-06| -1.35E-06| -1.56E-06|
| $X_{13}$ | -3.73E-06| -1.01E-06| -1.27E-06| -6.46E-07| -6.46E-07| 5.75E-07 | -2.56E-06| 8.37E-07 | -4.48E-07|
| $X_{14}$ | -7.25E-06| 1.78E-05 | -3.99E-06| 7.2E-07  | -5.78E-06| -2.05E-06| 1.4E-06  | -3.73E-07| -8.37E-08|
| $X_{15}$ | 1.92E-06 | -5.62E-05| -4.13E-06| 4.17E-06 | 1.02E-06 | -1.42E-06| -1.18E-07| 2.92E-07 | 3.15E-06 |
| $X_{16}$ | -3.63E-07| -4.16E-06| 2.55E-06 | -1.36E-06| 1.42E-06 | -4.44E-06| 1.94E-06 | -1.87E-06| 2.06E-06 |
| $X_{17}$ | 2.6E-06  | -2E-05   | -3.04E-07| -3.89E-06| -5.64E-06| -1.37E-06| -2.01E-06| 1.61E-07 | 1.72E-06 |

|          | $X_{10}$  | $X_{11}$  | $X_{12}$  | $X_{13}$  | $X_{14}$  | $X_{15}$  | $X_{16}$  | $X_{17}$  |
|----------|-----------|-----------|-----------|-----------|-----------|-----------|-----------|-----------|
| $X_1$    | -1.49E-06 | 3.26E-06  | 4.43E-06  | -3.73E-06 | -7.25E-06 | 1.92E-06  | -3.63E-07 | 2.6E-06   |
| $X_2$    | -1.95E-05 | 9.83E-06  | -2.53E-06 | -1.01E-06 | 1.78E-05  | -5.62E-05 | -4.16E-06 | -2E-05    |
| $X_3$    | -1.51E-06 | 9.22E-07  | 2.93E-06  | -1.27E-06 | -3.99E-06 | -4.13E-06 | 2.55E-06  | -3.04E-07 |
| $X_4$    | 9.35E-07  | -2.06E-06 | 3.41E-07  | -6.46E-07 | 7.2E-07   | 4.17E-06  | -1.36E-06 | -3.89E-06 |
| $X_5$    | -4.5E-07  | -1.6E-06  | 2.77E-06  | -3.09E-06 | -5.78E-06 | 1.02E-06  | 1.42E-06  | -5.64E-06 |
| $X_6$    | -5.74E-06 | -4.57E-06 | 4.36E-06  | 5.75E-07  | -2.05E-06 | -1.42E-06 | -4.44E-06 | -1.37E-06 |
| $X_7$    | -2.26E-06 | -1.75E-06 | -3.16E-06 | -2.56E-06 | 1.4E-06   | -1.18E-07 | 1.94E-06  | -2.01E-06 |
| $X_8$    | -7.31E-07 | -2.35E-06 | -1.35E-06 | 8.37E-07  | -3.73E-07 | 2.92E-07  | -1.87E-06 | 1.61E-07  |
| $X_9$    | 1.32E-06  | -2.86E-06 | -1.56E-06 | -4.48E-07 | -8.37E-08 | 3.15E-06  | 2.06E-06  | 1.72E-06  |
| $X_{10}$ | 4.36E-05  | -1.64E-05 | 1.22E-05  | -4.41E-06 | -1.32E-05 | 5.07E-06  | 5.42E-07  | -4.59E-06 |
| $X_{11}$ | -1.64E-05 | 3.02E-05  | -1.16E-05 | -1.73E-08 | 9.91E-06  | -8.37E-06 | 1.98E-06  | -4.68E-07 |
| $X_{12}$ | 1.22E-05  | -1.16E-05 | 0.000213  | -3.85E-06 | -0.000205 | 7.74E-06  | 3.6E-06   | -4.77E-06 |
| $X_{13}$ | -4.41E-06 | -1.73E-08 | -3.85E-06 | 2.02E-05  | -1.27E-06 | 5.62E-07  | 2.19E-06  | -1.9E-06  |
| $X_{14}$ | -1.32E-05 | 9.91E-06  | -0.000205 | -1.27E-06 | 0.000217  | -1.09E-05 | -6.08E-06 | -2.41E-07 |
| $X_{15}$ | 5.07E-06  | -8.37E-06 | 7.74E-06  | 5.62E-07  | -1.09E-05 | 7.12E-05  | -4.34E-06 | -9.08E-06 |
| $X_{16}$ | 5.42E-07  | 1.98E-06  | 3.6E-06   | 2.19E-06  | -6.08E-06 | -4.34E-06 | 1.64E-05  | 1.58E-06  |
| $X_{17}$ | -4.59E-06 | -4.68E-07 | -4.77E-06 | -1.9E-06  | -2.41E-07 | -9.08E-06 | 1.58E-06  | 4.73E-05  |

TABLE 6

MDs and MDAs for normal group

| | S. No. | | | | | | |
|---|---|---|---|---|---|---|---|
| | 1 | 2 | 3 | 4 | 5 | 6 | 7 |
| MD-inverse | 0.378374 | 0.431373 | 0.403562 | 0.500211 | 0.515396 | 0.495501 | 0.583142 |
| MD-Adjoint | 0.000005 | 0.000006 | 0.000005 | 0.000007 | 0.000007 | 0.000007 | 0.000008 |

| | S. No. | | | | | | |
|---|---|---|---|---|---|---|---|
| | 8 | ... | 196 | 197 | 198 | 199 | 200 | Average |
| MD-inverse | 0.565654 | ... | 1.74 | 1.75 | 1.78 | 1.76 | 2.36 | 0.995 |
| MD-Adjoint | 0.000007 | ... | 0.00002 | 0.00002 | 0.00002 | 0.00002 | 0.00003 | 0.000013 |

TABLE 7

MDs and MDAs for abnormals

| | S. No. | | | | | | | |
|---|---|---|---|---|---|---|---|---|
| | 1 | 2 | 3 | 4 | 5 | 6 | 7 | 8 |
| MD-Inverse | 7.72741 | 8.41629 | 10.29148 | 7.20516 | 10.59075 | 10.55711 | 13.31775 | 14.81278 |
| MD-adjoint | 0.00010 | 0.00011 | 0.00014 | 0.00009 | 0.00014 | 0.00014 | 0.00017 | 0.00019 |

| | S. No. | | | | | |
|---|---|---|---|---|---|---|
| | ... | 13 | 14 | 15 | 16 | 17 | Average |
| MD-Inverse | ... | 19.65543 | 43.04050 | 78.64045 | 97.27242 | 135.70578 | 30.39451 |
| MD-adjoint | ... | 0.00026 | 0.00057 | 0.00103 | 0.00128 | 0.00178 | 0.00040 |

$L_{32}(2^{31})$ OA is used to accommodate 17 variables. Table 8 gives dynamic S/N ratios for all the combinations of this array with inverse matrix method and adjoint matrix method. Table 9 shows gain in S/N ratios for both the methods. It is clear that gains in S/N ratios are same for both methods. The important variable combination based on these gains is: $X_4$-$X_5$-$X_{10}$-$X_{12}$-$X_{13}$-$X_{14}$-$X_{15}$-$X_{17}$. From Table 10, which shows system performance in the form of S/N ratios, it is clear that there is a gain of 1.98 dB units if useful variables are used instead of all the variables. This gain is also exactly same as that obtained in inverse matrix method.

Hence, even if an adjoint matrix method is used, the ultimate results would be the same. However, MDA values are advantageous because it will not take into account the determinant of correlation matrix. In case of multi-collinearity problems, as the determinant tend to become zero, the inverse matrix becomes inefficient giving rise to inaccurate MDs. Such problems can be avoided if MDAs are used based on adjoint matrix method.

TABLE 8

Dynamic S/N ratios for the combinations of $L_{32}(2^{31})$ array

| Run | S/N ratio (Inverse) | S/N ratio (Adjoint) |
|---|---|---|
| 1 | −6.252 | 42.560 |
| 2 | −6.119 | 42.693 |
| 3 | −10.024 | 38.788 |
| 4 | −10.181 | 38.631 |
| 5 | −10.348 | 38.464 |
| 6 | −10.495 | 38.317 |
| 7 | −7.934 | 40.878 |
| 8 | −8.177 | 40.635 |
| 9 | −9.234 | 39.578 |
| 10 | −9.631 | 39.181 |
| 11 | −3.338 | 45.474 |
| 12 | −3.406 | 45.406 |
| 13 | −10.932 | 37.880 |
| 14 | −11.121 | 37.691 |
| 15 | −6.495 | 42.317 |
| 16 | −7.265 | 41.547 |
| 17 | −7.898 | 40.914 |
| 18 | −7.665 | 41.147 |
| 19 | −10.156 | 38.656 |
| 20 | −9.901 | 38.911 |
| 21 | −5.431 | 43.381 |
| 22 | −5.312 | 43.500 |
| 23 | −7.603 | 41.209 |
| 24 | −7.498 | 41.314 |
| 25 | −11.412 | 37.400 |
| 26 | −11.100 | 37.712 |
| 27 | −5.874 | 42.938 |
| 28 | −4.989 | 43.823 |
| 29 | −9.238 | 39.574 |
| 30 | −8.989 | 39.823 |
| 31 | −5.544 | 43.268 |
| 32 | −5.303 | 43.509 |

TABLE 9

Gain in S/N Ratios

| Inverse Method Variable | Level 1 | Level 2 | Gain | Adjoint Method Variable | Level 1 | Level 2 | Gain |
|---|---|---|---|---|---|---|---|
| $X_1$ | −8.185 | −7.745 | −0.440 | $X_1$ | 40.627 | 41.067 | −0.440 |
| $X_2$ | −8.187 | −7.742 | −0.445 | $X_2$ | 40.625 | 41.070 | −0.445 |
| $X_3$ | −8.249 | −7.680 | −0.569 | $X_3$ | 40.563 | 41.132 | −0.569 |
| $X_4$ | −7.949 | −7.980 | 0.031 | $X_4$ | 40.863 | 40.832 | 0.031 |
| $X_5$ | −7.069 | −8.860 | 1.791 | $X_5$ | 41.743 | 39.952 | 1.791 |
| $X_6$ | −8.318 | −7.611 | −0.706 | $X_6$ | 40.494 | 41.201 | −0.706 |
| $X_7$ | −7.976 | −7.954 | −0.022 | $X_7$ | 40.836 | 40.858 | −0.022 |
| $X_8$ | −8.824 | −7.105 | −1.718 | $X_8$ | 39.988 | 41.707 | −1.718 |
| $X_9$ | −8.188 | −7.742 | −0.446 | $X_9$ | 40.625 | 41.070 | −0.446 |
| $X_{10}$ | −6.358 | −9.571 | 3.212 | $X_{10}$ | 42.454 | 39.241 | 3.212 |
| $X_{11}$ | −8.101 | −7.828 | −0.273 | $X_{11}$ | 40.711 | 40.984 | −0.273 |
| $X_{12}$ | −7.821 | −8.108 | 0.287 | $X_{12}$ | 40.991 | 40.704 | 0.287 |
| $X_{13}$ | −7.562 | −8.367 | 0.805 | $X_{13}$ | 41.250 | 40.445 | 0.805 |
| $X_{14}$ | −7.315 | −8.615 | 1.300 | $X_{14}$ | 41.497 | 40.197 | 1.300 |
| $X_{15}$ | −7.590 | −8.339 | 0.749 | $X_{15}$ | 41.222 | 40.473 | 0.749 |
| $X_{16}$ | −7.982 | −7.947 | −0.035 | $X_{16}$ | 40.830 | 40.865 | −0.035 |
| $X_{17}$ | −7.832 | −8.097 | 0.265 | $X_{17}$ | 40.980 | 40.715 | 0.265 |

TABLE 10

S/N Ratio Analysis

| S/N ratio-optimal system | 44.54 dB |
|---|---|
| S/N ratio-original system | 42.56 dB |
| Gain | 1.98 dB |

EXAMPLE 2

The adjoint matrix method is applied to another case with 12 variables. In this example, there are 58 normals and 30 abnormals. The MDs corresponding to normals are computed by using MTS method—the average MD is 0.92. The reason for this discrepancy is the existence of multi-collinearity. This is clear from the correlation matrix (Table 11), which shows that the variables $X_{10}$, $X_{11}$ and $X_{12}$ have high correlations with each other. The determinant of the matrix is also estimated and it is found to be $8.693 \times 10^{-12}$ (close to zero), indicating that the matrix is almost singular. Presence of multi-collinearity will also affect the other stages of the MTS method. Hence, adjoint matrix method is used to perform the analysis.

Adjoint Matrix Method

The adjoint of correlation matrix is shown in Table 12.

TABLE 11

Correlation Matrix

| | $X_1$ | $X_2$ | $X_3$ | $X_4$ | $X_5$ | $X_6$ | $X_7$ | $X_8$ | $X_9$ | $X_{10}$ | $X_{11}$ | $X_{12}$ |
|---|---|---|---|---|---|---|---|---|---|---|---|---|
| $X_1$ | 1 | 0.358 | −0.085 | −0.024 | 0.005 | 0.057 | −0.149 | −0.128 | −0.046 | 0.105 | −0.055 | −0.055 |
| $X_2$ | 0.358 | 1 | 0.014 | 0.022 | 0.003 | −0.097 | −0.271 | −0.079 | 0.061 | 0.325 | 0.023 | 0.023 |
| $X_3$ | −0.085 | 0.014 | 1 | 0.0769 | 0.0708 | 0.0577 | 0.3138 | 0.1603 | 0.0815 | 0.4945 | 0.5286 | 0.5333 |
| $X_4$ | −0.024 | 0.022 | 0.0769 | 1 | −0.135 | −0.018 | 0.296 | −0.206 | 0.062 | 0.597 | 0.624 | 0.622 |
| $X_5$ | 0.005 | 0.003 | 0.0708 | −0.135 | 1 | 0.123 | 0.264 | 0.114 | 0.053 | 0.536 | 0.560 | 0.559 |
| $X_6$ | 0.057 | −0.097 | 0.0577 | −0.018 | 0.123 | 1 | 0.353 | 0.055 | 0.056 | 0.063 | 0.096 | 0.096 |
| $X_7$ | −0.149 | −0.271 | 0.3138 | 0.296 | 0.264 | 0.353 | 1 | 0.103 | 0.092 | 0.395 | 0.508 | 0.508 |
| $X_8$ | −0.128 | −0.079 | 0.1603 | −0.206 | 0.114 | 0.055 | 0.103 | 1 | −0.153 | −0.032 | −0.002 | −0.0004 |
| $X_9$ | −0.046 | 0.061 | 0.0815 | 0.062 | 0.053 | 0.056 | 0.092 | −0.153 | 1 | 0.116 | 0.104 | 0.104 |
| $X_{10}$ | 0.105 | 0.325 | 0.4945 | 0.597 | 0.536 | 0.063 | 0.395 | −0.032 | 0.116 | 1 | 0.951 | 0.951 |
| $X_{11}$ | −0.055 | 0.023 | 0.5286 | 0.624 | 0.560 | 0.096 | 0.508 | −0.002 | 0.104 | 0.951 | 1 | 0.999 |
| $X_{12}$ | −0.055 | 0.023 | 0.5333 | 0.622 | 0.559 | 0.096 | 0.508 | −0.0004 | 0.104 | 0.951 | 0.999 | 1 |

TABLE 12

Adjoint Matrix

| | $X_1$ | $X_2$ | $X_3$ | $X_4$ | $X_5$ | $X_6$ |
|---|---|---|---|---|---|---|
| $X_1$ | 1.00912E−10 | 4.70272E−10 | 1.61623E−10 | 2.76032E−10 | 2.57713E−10 | −5.48951E−12 |
| $X_2$ | 4.70263E−10 | 2.50034E−09 | 9.18237E−10 | 1.55621E−09 | 1.45406E−09 | −2.10511E−11 |
| $X_3$ | 1.61527E−10 | 9.17746E−10 | 1.06463E−09 | 1.63137E−09 | 1.50922E−09 | 5.28862E−13 |
| $X_4$ | 2.7594E−10 | 1.55576E−09 | 1.63154E−09 | 2.56985E−09 | 2.37158E−09 | −3.57245E−13 |

TABLE 12-continued

Adjoint Matrix

| | | | | | | |
|---|---|---|---|---|---|---|
| $X_5$ | 2.57631E−10 | 1.45366E−09 | 1.50939E−09 | 2.37159E−09 | 2.20389E−09 | −1.73783E−12 |
| $X_6$ | −5.4903E−12 | −2.10556E−11 | 5.23064E−13 | −3.64155E−13 | −1.74411E−12 | 1.06058E−11 |
| $X_7$ | 5.04604E−12 | 2.83284E−11 | 2.05079E−11 | 3.50574E−11 | 3.34989E−11 | −4.37759E−12 |
| $X_8$ | 7.12086E−13 | −3.11071E−12 | −9.19606E−12 | −1.10978E−11 | −1.29962E−11 | −1.97598E−13 |
| $X_9$ | 1.43722E−12 | 8.0730E−13 | −1.32908E−11 | −1.89556E−11 | −1.78591E−11 | −5.79657E−13 |
| $X_{10}$ | −1.66565E−09 | −8.74446E−10 | −3.1875E−09 | −5.4102E−09 | −5.05514E−09 | 7.53194E−11 |
| $X_{11}$ | 7.60305E−10 | 4.38609E−09 | 5.67096E−09 | 6.22205E−09 | 5.62443E−09 | 5.56545E−13 |
| $X_{12}$ | 4.14615E−10 | 1.61673E−09 | −5.08692E−09 | −4.90701E−09 | −4.36272E−09 | −6.98298E−11 |

| | $X_7$ | $X_8$ | $X_9$ | $X_{10}$ | $X_{11}$ | $X_{12}$ |
|---|---|---|---|---|---|---|
| $X_1$ | 5.043E−12 | 7.14809E−13 | 1.43647E−12 | −1.66567E−09 | 7.66095E−10 | 4.08691E−10 |
| $X_2$ | 2.83118E−11 | −3.09613E−12 | 8.03373E−13 | −8.7444E−09 | 4.41674E−09 | 1.58527E−09 |
| $X_3$ | 2.04944E−11 | −9.18812E−12 | −1.3292E−11 | −3.18575E−09 | 5.68418E−09 | −5.10159E−09 |
| $X_4$ | 3.50392E−11 | −1.10855E−11 | −1.89581E−11 | −5.40857E−09 | 6.24469E−09 | −4.93127E−09 |
| $X_5$ | 3.34823E−11 | −1.29848E−11 | −1.78615E−11 | −5.0537E−09 | 5.64554E−09 | −4.38529E−09 |
| $X_6$ | −4.37752E−12 | −1.97695E−13 | −5.79622E−13 | 7.5335E−11 | 3.17881E−13 | −6.9595E−11 |
| $X_7$ | 1.58563E−11 | −1.42556E−11 | −1.00253E−12 | −8.62928E−11 | −1.25906E−10 | 1.486E−10 |
| $X_8$ | −1.42569E−12 | 1.01743E−11 | 1.84668E−12 | 1.04492E−11 | 1.34899E−10 | −1.25096E−10 |
| $X_9$ | −1.00246E−12 | 1.84666E−12 | 9.46854E−12 | −6.93471E−12 | −2.47767E−11 | 5.98708E−11 |
| $X_{10}$ | −8.62349E−11 | 1.03982E−11 | −6.92086E−12 | 3.07209E−08 | −1.50768E−08 | −6.10343E−09 |
| $X_{11}$ | −1.26294E−10 | 1.35001E−10 | −2.47494E−11 | −1.49692E−08 | 2.88114E−07 | −2.83899E−07 |
| $X_{12}$ | 1.48962E−10 | −1.25168E−10 | 5.98339E−11 | −6.21375E−09 | −2.8383E−07 | 2.97854E−07 |

Figure 3:
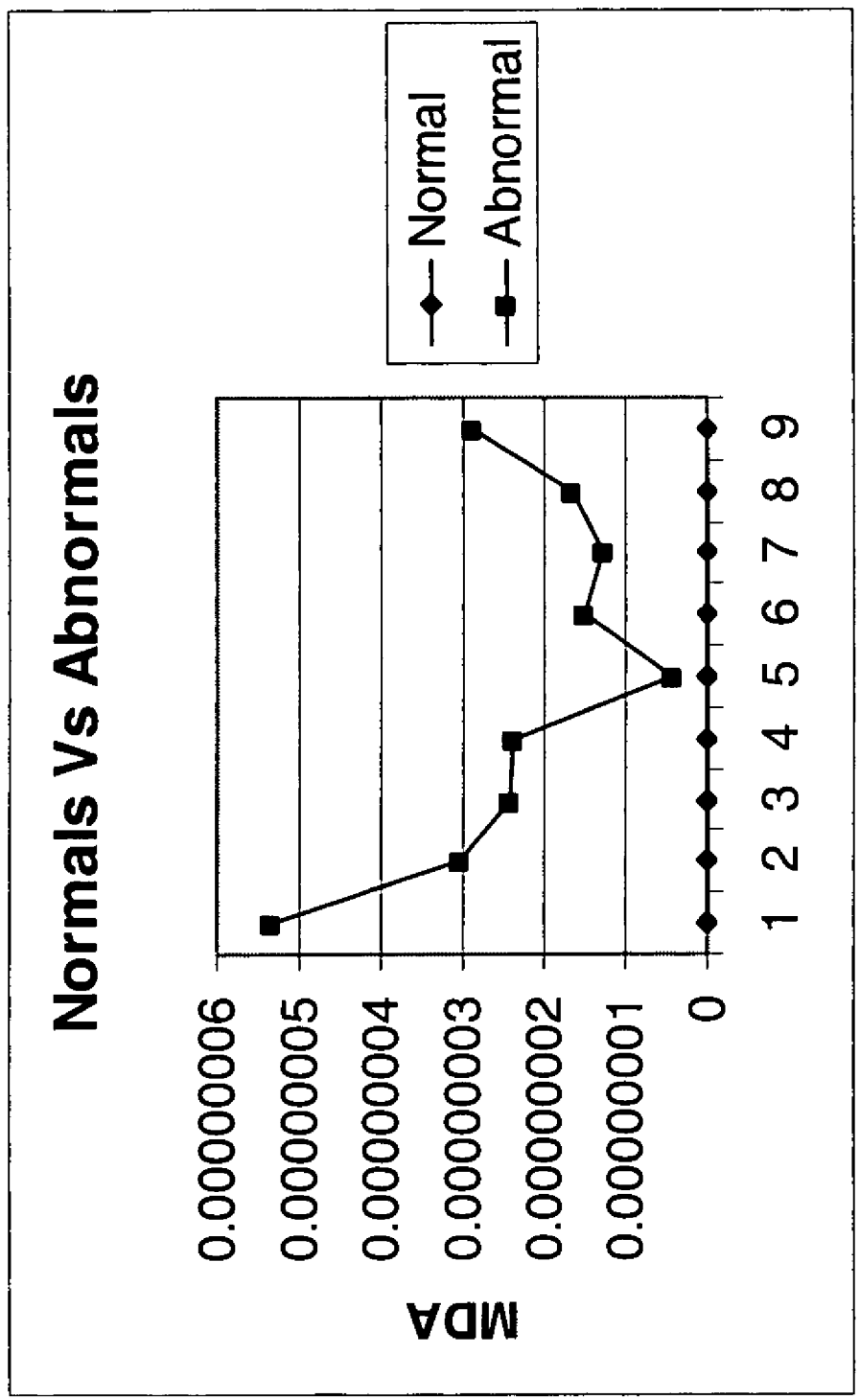
FIG. 3 is a graphical representation of MDAs values for normal and abnormal values for nine separate data points.

After computing MDA values for normals, the measurement scale is validated by computing abnormal MDA values. FIG. 3 indicates that there is a clear distinction between normals and abnormals.

Figure 4:
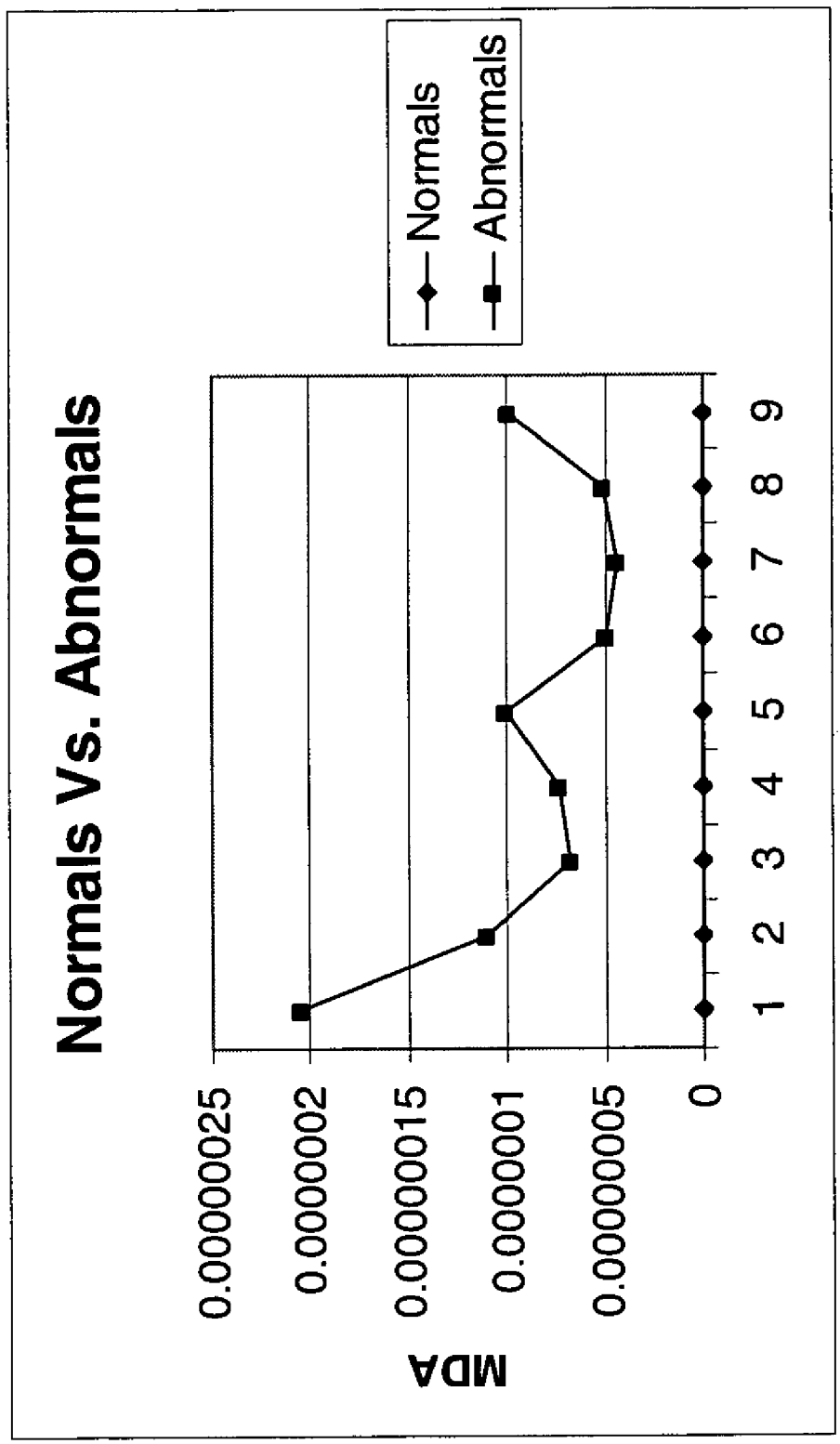
FIG. 4 is a graphical representation of MDA values for normal versus abnormal values with important variable usage, for the data of FIG. 3.

In the next step, important variables are selected using $L_{16}(2^{15})$ array. The S/N ratio analysis was performed based on larger-the-better criterion in usual way. The gains in S/N ratios are shown in Table 13. From this table, it is clear that the variables $X_1$-$X_2$-$X_3$- $X_4$- $X_6$- $X_{10}$-$X_{11}$-$X_{12}$ have positive gains and hence they are important. The confirmation run with these variables (FIG. 4) indicates that distinction (between normals and abnormals) is very good.

TABLE 13

Gain in S/N ratio

| Variable | Level 1 | Level 2 | Gain |
|---|---|---|---|
| $X_1$ | −102.90 | −105.01 | 2.12 |
| $X_2$ | −103.53 | −104.38 | 0.86 |
| $X_3$ | −103.84 | −104.07 | 0.22 |
| $X_4$ | −103.72 | −104.19 | 0.47 |
| $X_5$ | −104.04 | −103.86 | −0.18 |
| $X_6$ | −103.87 | −104.04 | 0.16 |
| $X_7$ | −104.18 | −103.72 | −0.46 |
| $X_8$ | −104.14 | −103.77 | −0.37 |
| $X_9$ | −104.33 | −103.58 | −0.76 |
| $X_{10}$ | −103.51 | −104.40 | 0.90 |
| $X_{11}$ | −103.78 | −104.13 | 0.35 |
| $X_{12}$ | −103.43 | −104.48 | 1.05 |

Therefore, adjoint matrix method can safely replace inverse matrix method as it is as efficient as inverse matrix method in general and more efficient when there are problems of multi-collinearity.

EXAMPLE 3

From the 17 variables, eight subsets (as shown in Table 14) are selected. These subsets are selected to illustrate the MMD methodology; there is no rational for this selection. It is to be noted that the number of variables in each subset are not the same.

TABLE 14

Subsets for MMD analysis

| Subset | Variables |
|---|---|
| $S_1$ | $X_1$ - $X_2$ - $X_3$ - $X_4$ |
| $S_2$ | $X_5$ - $X_6$ - $X_7$ - $X_8$ |
| $S_3$ | $X_9$ - $X_{10}$ - $X_{11}$ - $X_{12}$ |
| $S_4$ | $X_{13}$ - $X_{14}$ - $X_{15}$ - $X_{16}$ - $X_{17}$ |
| $S_5$ | $X_3$ - $X_4$ - $X_5$ - $X_6$ |
| $S_6$ | $X_{10}$ - $X_{11}$ - $X_{12}$ - $X_{13}$ - $X_{14}$ - $X_{15}$ |
| $S_7$ | $X_{14}$ - $X_{15}$ - $X_{16}$ - $X_{17}$ |
| $S_8$ | $X_2$ - $X_5$ - $X_7$ - $X_{10}$ - $X_{12}$ - $X_{13}$ - $X_{14}$ - $X_{15}$ |

For each subset, Mahalanobis distances are computed with the help of correlation matrices of respective variables. Therefore, we have eight sets of MDs (for normals and abnormals) corresponding to the subsets. The $\sqrt{}$MDs provide data corresponding to the subsets that are considered as control factors. Tables 15 and 16 show sample data ($\sqrt{}$MDs) for normals and abnormals.

TABLE 15

$\sqrt{}$MDs for normals (sample data)

| S. No | $S_1$ | $S_2$ | $S_3$ | $S_4$ | $S_5$ | $S_6$ | $S_7$ | $S_8$ |
|---|---|---|---|---|---|---|---|---|
| 1 | 0.873 | 0.545 | 0.707 | 0.756 | 0.796 | 0.505 | 0.832 | 0.574 |
| 2 | 0.762 | 0.540 | 0.929 | 0.710 | 0.499 | 0.688 | 0.606 | 0.807 |
| 3 | 1.022 | 0.688 | 0.550 | 0.623 | 0.955 | 0.479 | 0.697 | 0.613 |
| 4 | 1.102 | 0.544 | 0.769 | 0.740 | 1.225 | 0.648 | 0.827 | 0.681 |
| 5 | 1.022 | 0.640 | 0.602 | 0.888 | 0.815 | 0.782 | 0.934 | 0.695 |
| . | . | . | . | . | . | . | . | . |
| . | . | . | . | . | . | . | . | . |
| . | . | . | . | . | . | . | . | . |
| 196 | 1.041 | 0.786 | 1.691 | 1.513 | 0.500 | 1.550 | 1.539 | 1.411 |
| 197 | 1.467 | 1.310 | 2.101 | 1.201 | 1.457 | 1.481 | 0.611 | 1.373 |
| 198 | 1.086 | 1.278 | 0.974 | 1.406 | 1.410 | 1.834 | 0.994 | 1.648 |
| 199 | 1.238 | 0.999 | 1.107 | 1.061 | 1.206 | 1.132 | 0.964 | 1.700 |
| 200 | 1.391 | 0.924 | 0.979 | 0.680 | 1.094 | 2.156 | 0.750 | 1.844 |

TABLE 16

√MDs for abnormals (sample data)

| S. No | $S_1$ | $S_2$ | $S_3$ | $S_4$ | $S_5$ | $S_6$ | $S_7$ | $S_8$ |
|---|---|---|---|---|---|---|---|---|
| 1 | 1.339 | 2.930 | 2.610 | 3.428 | 2.574 | 3.277 | 2.913 | 3.734 |
| 2 | 1.491 | 3.469 | 1.931 | 1.511 | 3.267 | 3.388 | 1.687 | 3.932 |
| 3 | 1.251 | 2.700 | 0.742 | 2.631 | 2.447 | 3.322 | 2.660 | 4.365 |
| 4 | 2.124 | 2.507 | 2.041 | 3.240 | 2.518 | 3.058 | 2.009 | 3.395 |
| 5 | 1.010 | 2.182 | 2.867 | 1.279 | 1.861 | 4.035 | 1.090 | 4.440 |
| . | . | . | . | . | . | . | . | . |
| . | . | . | . | . | . | . | . | . |
| . | . | . | . | . | . | . | . | . |
| 13 | 1.769 | 2.819 | 6.544 | 2.153 | 2.352 | 6.023 | 2.177 | 5.776 |
| 14 | 1.898 | 2.045 | 3.817 | 4.551 | 2.443 | 10.213 | 1.969 | 9.275 |
| 15 | 1.624 | 12.681 | 2.116 | 3.672 | 12.248 | 9.064 | 1.202 | 11.426 |
| 16 | 5.453 | 13.314 | 3.630 | 1.022 | 13.515 | 10.095 | 1.108 | 12.121 |
| 17 | 4.511 | 16.425 | 5.489 | 3.684 | 12.027 | 11.142 | 2.264 | 10.939 |

After arranging the data (√MDs) in this manner, MMD analysis is carried out. In this analysis, MMDs are Mahalanobis distances obtained from √MDs. Table 17 and 18 provide sample values of MMDs for normals and abnormals respectively.

TABLE 17

MMDs for normals (sample values)

| Condition | 1 | 2 | 3 | 4 | 5 | 6 | 7 | 8 | 9 | 10 | ... | 198 | 199 | 200 |
|---|---|---|---|---|---|---|---|---|---|---|---|---|---|---|
| MMD | 0.558 | 0.861 | 0.425 | 0.786 | 0.413 | 1.655 | 0.357 | 0.660 | 0.641 | 0.717 | ... | 2.243 | 2.243 | 4.979 |

TABLE 18

MMDs for abnormals (sample values)

| Condition | 1 | 2 | 3 | 4 | 5 | 6 | 7 | 8 | 9 | 10 | ... | 15 | 16 | 17 |
|---|---|---|---|---|---|---|---|---|---|---|---|---|---|---|
| MMD | 22.52 | 29.86 | 30.61 | 23.47 | 27.05 | 57.12 | 61.61 | 52.64 | 50.77 | 66.15 | ... | 515.50 | 601.30 | 592.37 |

The next step is to assign the subsets to the columns of a suitable orthogonal array. Since there are eight subsets, $L_{12}(2^{11})$ array was selected. The abnormal MMDs are computed for each run of this array. After performing average response analysis, gains in S/N ratios are computed for all the subsets. These details are shown in Table 19.

TABLE 19

Gain in S/N ratios

|  | Level 1 | Level 2 | Gain |
|---|---|---|---|
| $S_1$ | 15.498 | 18.053 | -2.555 |
| $S_2$ | 17.463 | 16.089 | 1.374 |
| $S_3$ | 16.712 | 16.839 | -0.127 |
| $S_4$ | 15.925 | 17.627 | -1.702 |
| $S_5$ | 17.626 | 15.926 | 1.700 |
| $S_6$ | 17.243 | 16.309 | 0.934 |
| $S_7$ | 15.683 | 17.869 | -2.186 |
| $S_8$ | 18.556 | 14.996 | 3.560 |

From this table it is clear that $S_8$ has highest gain indicating that this is very important subset. It should be noted that the variables in this subset are same as the useful variables obtained from MTS method. This example is a simple case where we have only 17 variables and therefore here, MMD method may not be necessary. However, in complex cases, with several hundreds of variables, MMD method is more appropriate and reliable.

EXAMPLE 4

Figure 5:
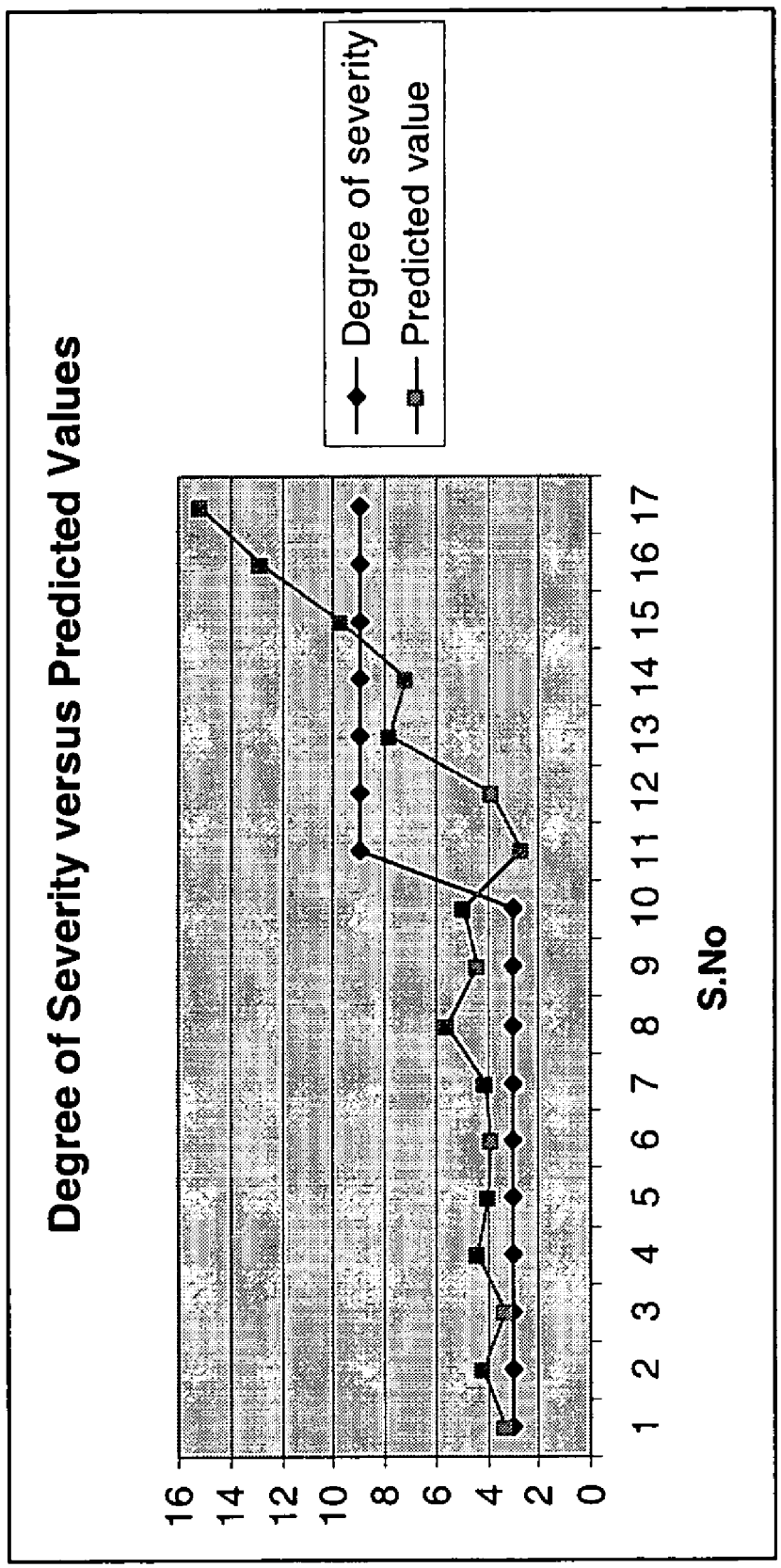
FIG. 5 is a graphical representation of Gram-Schmidt predicted values as a function of variable number compared with assigned values for a seventeen variable test set.

In order to demonstrate the applicability of Gram-Schmidt process to predict abnormal conditions without computing the Mahalanobis distances, it is applied to the medical diagnosis case example previously discussed with 17 abnormal conditions. Out of 17 conditions, the first ten conditions are considered mild and the remaining seven conditions are considered as medium. This judgment was made by Dr. Kanetaka, who is a liver disease diagnosis specialist in Japan. For the purposes of prediction and since true values of severity are unknown, a value of 3 is assigned for the mild group and a value of 9 is assigned for the medium group. Table 20 provides the summary of data analysis for abnormals in this case example generated by GSP. FIG. 5 shows that there is a good match between actual level of severity and predicted values.

Figure 6:
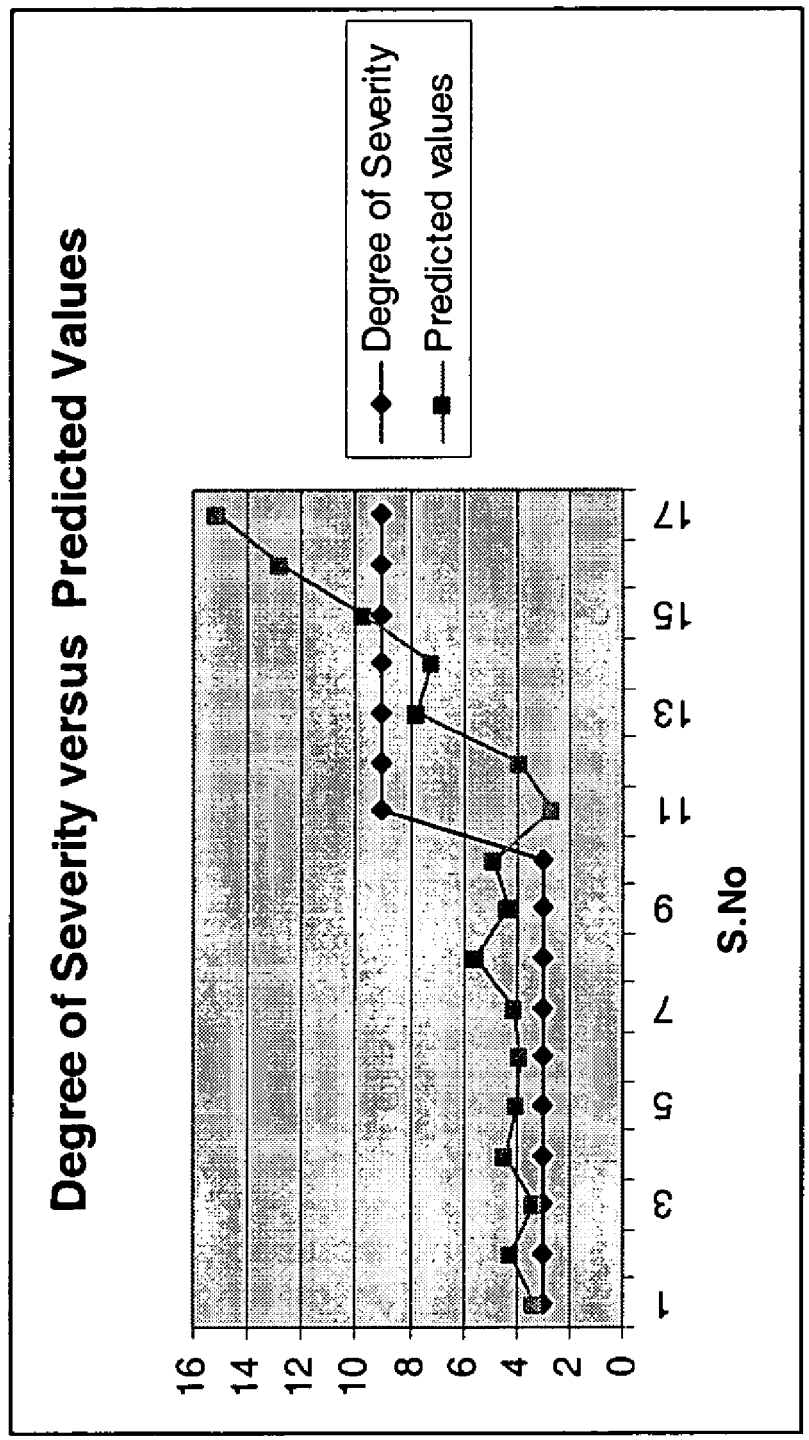
FIG. 6 is a graphical representation of Gram-Schmidt predicted values as a function of variable number compared with assigned values for a nineteen variable test set including two variables with zero standard deviation.

Intentionally, two variables with zero standard deviations are introduced. These variables are considered as the first and second variables and now the total number of variables is 19. Table 21 provides the summary of data analysis for abnormals in this instance. Like the data of FIG. 5, there is a good match between actual level of severity and predicted values as shown in FIG. 6.

TABLE 20

Summary of data analysis

| Abnormal | Mi(*) | U1 | U2 | U3 | U4 | U5 | U6 | U7 | U8 | U9 |
|---|---|---|---|---|---|---|---|---|---|---|
| 1 | 3 | 12.3150 | −4.3293 | 0.5390 | −0.1329 | −275.8953 | 8.9867 | 3.6369 | 39.6987 | 3.9237 |
| 2 | 3 | 16.3150 | −3.8353 | −0.5307 | −0.1940 | −319.9262 | 18.5124 | 10.4489 | 8.8425 | 121.4416 |
| 3 | 3 | 7.3150 | −4.9467 | −0.4990 | −0.1476 | −290.7776 | 5.0656 | −2.3387 | 37.3756 | 14.1496 |
| 4 | 3 | 8.3150 | 4.1768 | 0.8948 | −0.3463 | −290.5790 | 7.1602 | 6.2609 | 33.9778 | −6.3051 |
| 5 | 3 | 7.3150 | 4.0533 | 0.1872 | −0.2073 | −343.8372 | −1.7947 | 2.2598 | −13.7225 | 107.8699 |
| 6 | 3 | 6.3150 | 3.9298 | −0.0204 | 0.0298 | −291.4935 | 22.5440 | 42.6023 | 25.0359 | 46.8510 |
| 7 | 3 | 6.3150 | 3.9298 | −0.0204 | 0.0298 | −291.4935 | 22.5440 | 42.6023 | 25.0359 | 46.8510 |
| 8 | 3 | 15.3150 | 5.0412 | 0.0479 | −0.2370 | −341.6418 | 2.4900 | 10.2859 | 24.1717 | −39.7420 |
| 9 | 3 | 10.3150 | 4.4238 | −0.3900 | −0.0740 | −305.7720 | 6.8612 | 25.8275 | 38.7990 | −12.8711 |
| 10 | 3 | 16.3150 | 5.1647 | 0.7555 | 0.5240 | −370.9332 | 1.6020 | 4.0528 | 31.8943 | −47.3453 |
| 11 | 9 | 1.3150 | −5.6876 | 0.1555 | −0.2124 | −392.3597 | 8.9167 | 6.3679 | 72.2190 | 98.6360 |
| 12 | 9 | 11.3150 | 4.5473 | −0.1824 | 0.0890 | −184.5821 | 12.6035 | 7.9285 | 28.6425 | 68.2139 |
| 13 | 9 | 28.3150 | 6.6465 | 0.3466 | −0.1298 | −350.1662 | 8.8457 | 9.9694 | −1.6063 | −39.3698 |
| 14 | 9 | 16.3150 | 5.1647 | −0.8445 | −0.1499 | −214.0392 | 13.3253 | 3.1878 | 4.0448 | 19.3168 |
| 15 | 9 | 7.3150 | 4.0533 | −0.7128 | −0.2239 | −411.5070 | 123.3593 | 28.1580 | −25.7886 | −99.2166 |
| 16 | 9 | 11.3150 | 4.5473 | −1.9824 | −1.1442 | −501.5225 | 129.5946 | 18.9048 | 58.9901 | −172.0809 |
| 17 | 9 | 16.3150 | 5.1647 | −1.2445 | −1.0684 | −529.9412 | 114.1371 | −43.2615 | 278.3264 | −248.7397 |
| SN Ratio | | 0.0532 | 0.0103 | 0.0072 | 0.0144 | 0.0936 | 0.0255 | 0.0027 | 0.0113 | 0.0018 |
| Beta | | 1.7478 | 0.4151 | −0.0568 | −0.0424 | −49.6562 | 6.0562 | 1.0932 | 6.8292 | −4.0406 |

| Abnormal | U10 | U11 | U12 | U13 | U14 | U15 | U16 | U17 | Yi (Predicted) |
|---|---|---|---|---|---|---|---|---|---|
| 1 | −4.9805 | −6.0171 | 91.7303 | 185.2230 | 10.9136 | 0.3937 | 2.6036 | −0.0004 | 3.2929 |
| 2 | 38.7007 | 3.1131 | 15.1255 | 22.6190 | 40.5201 | −0.1010 | −1.7837 | 0.1886 | 4.1392 |
| 3 | 13.9428 | 1.1665 | 15.5386 | 146.1268 | 34.6194 | 0.9444 | −2.8997 | 0.3113 | 3.2915 |
| 4 | 9.1650 | −16.1595 | 59.3059 | 190.3586 | 11.0576 | −0.0293 | −0.5074 | −1.1519 | 4.3706 |
| 5 | 100.2455 | −3.5307 | −9.7133 | 59.8334 | 41.1504 | −0.1751 | −2.4316 | 0.3238 | 3.9720 |
| 6 | −26.2873 | −11.2102 | 56.9628 | 12.4162 | 22.6997 | 0.1299 | −3.6248 | 0.2957 | 3.8183 |
| 7 | −26.2873 | −11.2102 | 56.9628 | 12.4162 | 40.6997 | 0.0817 | −4.4633 | 0.2882 | 4.0515 |
| 8 | 11.8856 | −2.4939 | 73.6173 | 306.5702 | 40.4239 | −0.0696 | 1.4407 | 0.3877 | 5.5233 |
| 9 | 14.9592 | −0.2392 | 151.5367 | 257.3016 | −26.2885 | 0.2335 | −1.2968 | 0.1731 | 4.3308 |
| 10 | 47.0552 | −7.1287 | 134.6759 | 27.4059 | 63.9149 | −0.1744 | −4.2087 | −1.3234 | 4.9031 |
| 11 | 111.2423 | 4.9965 | 80.8134 | 41.7231 | −16.1479 | 0.2477 | 1.7410 | −1.4001 | 2.6406 |
| 12 | 130.3151 | −33.2593 | 38.1854 | 7.0779 | −28.0403 | 0.6798 | 0.5761 | −0.3027 | 3.8651 |
| 13 | 197.4488 | −47.7848 | 31.1967 | −16.6519 | 13.2784 | 0.0870 | 0.6182 | −3.0672 | 7.7527 |
| 14 | 106.7722 | −30.7073 | −41.6234 | 316.9091 | 109.3155 | −0.2722 | −1.5941 | 0.7008 | 7.1760 |
| 15 | −111.3313 | −65.5057 | −54.0664 | 274.0644 | 97.0167 | −0.3268 | −12.9302 | −0.3416 | 9.7211 |
| 16 | −60.0760 | −77.8632 | −90.3734 | 51.7804 | 114.7708 | −0.4847 | −19.8192 | 1.6757 | 12.8493 |
| 17 | 62.1727 | −78.6159 | −84.2628 | 304.0971 | 110.2218 | −0.7889 | −22.3489 | 0.8951 | 15.0976 |
| SN Ratio | 0.0087 | 0.0538 | 0.0003 | 0.0197 | 0.0234 | 0.0002 | 0.0150 | 0.0006 | |
| Beta | 6.7947 | −4.7485 | 1.3030 | 18.9830 | 6.7624 | −0.0061 | −0.8148 | −0.0275 | |

(*)Mi = True level of severity

TABLE 21

Summary of data analysis with 19 variables (2 variables with zero variance)

| Abnormal | Mi(*) | U1 | U2 | U3 | U4 | U5 | U6 | U7 | U8 | U9 | U10 |
|---|---|---|---|---|---|---|---|---|---|---|---|
| 1 | 3 | 0 | −5 | 12.3150 | −4.8232 | 0.5086 | −0.0050 | −247.2041 | 5.9966 | 9.8345 | 38.4890 |
| 2 | 3 | 0 | −10 | 16.3150 | −5.8111 | −0.6521 | −0.3753 | −339.3995 | 13.2639 | 21.7816 | 3.5642 |
| 3 | 3 | −3 | 0 | 7.3150 | −5.6876 | −0.5445 | −0.3327 | −317.0591 | 0.4772 | −2.7434 | 27.4543 |
| 4 | 3 | 0 | −4 | 8.3150 | 4.6707 | 0.9390 | 0.0301 | −121.7981 | 7.4455 | 24.5579 | 31.1738 |
| 5 | 3 | −4 | 0 | 7.3150 | 3.3124 | 0.1555 | −0.1327 | −222.0592 | −2.6516 | 8.1690 | −27.5355 |
| 6 | 3 | −4 | 0 | 6.3150 | 3.8063 | −0.0142 | 0.1228 | −174.4202 | 20.2183 | 65.1913 | 10.9267 |
| 7 | 3 | −4 | 5 | 6.3150 | 2.0775 | −0.1205 | −0.0104 | −189.7995 | 21.4092 | 69.3419 | 17.3681 |
| 8 | 3 | −4 | 0 | 15.3150 | 5.0412 | 0.0617 | −0.0996 | −217.5968 | 0.0803 | 11.0121 | 5.9138 |
| 9 | 3 | 0 | 7 | 10.3150 | 4.5473 | −0.3686 | −0.0551 | −208.6192 | 3.1314 | 30.5279 | 18.3591 |
| 10 | 3 | 0 | 7 | 16.3150 | 2.2010 | 0.5871 | 0.7156 | −221.5125 | 1.9417 | 11.9757 | 31.8713 |
| 11 | 9 | 0 | 7 | 1.3150 | −6.4285 | 0.1099 | −0.1937 | −379.0782 | 3.8004 | 18.6867 | 69.3825 |
| 12 | 9 | −4 | 7 | 11.3150 | 2.2010 | −0.3129 | 0.0748 | −72.5950 | 16.7374 | 24.9889 | 30.3079 |
| 13 | 9 | 0 | 5 | 28.3150 | 4.9177 | 0.2541 | 0.0171 | −210.4862 | 10.2735 | 16.2116 | −14.0044 |
| 14 | 9 | 0 | −10 | 16.3150 | 2.0775 | −1.0205 | −0.3085 | −122.6345 | 17.0910 | 23.8848 | 8.1721 |
| 15 | 9 | −5 | 0 | 7.3150 | 2.0775 | −0.8205 | −0.2677 | −308.3187 | 119.6389 | 150.9857 | 34.6156 |
| 16 | 9 | 0 | −10 | 11.3150 | 4.6707 | −1.9610 | −1.3495 | −426.0316 | 125.1581 | 152.5561 | 106.4050 |
| 17 | 9 | −6 | 0 | 16.3150 | 4.3003 | −1.2838 | −1.1606 | −429.4657 | 109.5444 | 65.6972 | 335.1143 |
| SN Ratio | | 0.014554 | 5.1E−06 | 0.0532 | 0.0031 | 0.0103 | 0.0108 | 0.0692 | 0.0254 | 0.0306 | 0.0131 |
| Beta | | −0.29224 | −0.0137 | 1.7478 | 0.2319 | −0.0664 | −0.0443 | −37.0105 | 5.8358 | 7.3456 | 8.5277 |

| Abnormal | U11 | U12 | U13 | U14 | U15 | U16 | U17 | U18 | U19 | Yi (predicted) |
|---|---|---|---|---|---|---|---|---|---|---|
| 1 | 53.9519 | 3.2878 | −0.3439 | 91.0072 | 218.5704 | 96.9192 | 0.5103 | 3.8723 | 1.2164 | 3.4401 |

TABLE 21-continued

Summary of data analysis with 19 variables (2 variables with zero variance)

|   |   |   |   |   |   |   |   |   |   |   |
|---|---|---|---|---|---|---|---|---|---|---|
| 2 | 159.4430 | 47.6378 | 25.7567 | 19.9424 | 38.6237 | 46.2383 | −0.0509 | −0.9670 | −0.6080 | 4.5581 |
| 3 | 51.3503 | 3.1881 | −0.1598 | 5.8983 | 115.8052 | 36.4650 | 0.9933 | 0.8872 | 0.2391 | 3.3564 |
| 4 | 53.6886 | 53.5027 | 8.1512 | 51.5605 | 235.2134 | 51.7450 | 0.6046 | 0.4109 | 2.1180 | 3.9019 |
| 5 | 138.1347 | 114.7010 | 28.9314 | −20.1444 | 90.6090 | 21.4934 | 0.4055 | −1.6543 | 2.2187 | 5.4607 |
| 6 | 52.9944 | 27.4622 | 7.3102 | 44.3797 | 61.9772 | 61.8750 | 0.7963 | 0.5993 | 3.5203 | 4.4063 |
| 7 | 82.0347 | 36.8372 | 15.0119 | 58.2735 | 81.3859 | 106.1382 | 0.7853 | 1.9013 | 3.6687 | 5.3589 |
| 8 | −24.2147 | 26.4896 | 2.1381 | 46.1576 | 340.1646 | 99.7916 | 0.6016 | 3.2652 | 3.3896 | 4.9194 |
| 9 | −8.2040 | 44.8183 | 18.3955 | 140.4198 | 327.9404 | 87.4870 | 0.7817 | −0.4917 | 4.4366 | 5.4957 |
| 10 | 32.3709 | 77.3551 | 15.0769 | 128.5416 | 125.2338 | 194.5158 | 0.5961 | 2.2735 | 2.5394 | 5.3191 |
| 11 | 187.6399 | 124.2687 | 54.5396 | 103.9712 | 110.3184 | 88.6731 | 0.2902 | 1.7963 | −0.4638 | 6.5812 |
| 12 | 111.9320 | 173.9234 | 28.8658 | 55.6367 | 130.8877 | 50.1456 | 1.1011 | 2.4019 | 4.3666 | 7.7220 |
| 13 | −15.2533 | 222.0768 | 24.0090 | 40.3074 | 119.3488 | 73.5301 | 0.6111 | 0.7587 | 1.1598 | 7.5838 |
| 14 | 64.6856 | 144.6806 | 16.3409 | −40.5239 | 368.8209 | 75.5318 | 0.3851 | 1.9974 | 3.5958 | 7.0952 |
| 15 | 47.0662 | 60.0346 | 6.3440 | −69.0617 | 300.2732 | 41.4337 | 0.5561 | 0.2120 | 3.1967 | 7.2938 |
| 16 | 9.8985 | 117.4264 | 14.7535 | −96.3428 | 45.6021 | 44.7032 | 0.5710 | −1.0853 | 4.1349 | 8.9292 |
| 17 | 107.1847 | 208.8039 | 51.0812 | −54.2971 | 284.1616 | 78.3278 | 0.2070 | −3.1676 | 3.5720 | 12.3893 |
| SNRatio | 0.0223 | 0.1451 | 0.0545 | 0.0006 | 0.0388 | 0.0288 | 0.0351 | 0.0020 | 0.0384 |   |
| Beta | 9.7306 | 16.3878 | 3.2332 | 1.7585 | 26.0902 | 9.8617 | 0.0785 | 0.0860 | 0.3718 |   |

(*)Mi = True level of severity

Publications mentioned in the specification are indicative of the levels of those skilled in the art to which the invention pertains. These publications are incorporated herein by reference to the same extent as if each individual publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process for multivariate data analysis comprising the steps of:
    using a computer in conjunction with a Gram-Schmidt orthogonalization process to determine normal Gram-Schmidt vectors defining a set of normal Gram-Schmidt coefficients corresponding to observable normal values of a plurality of normal datum where at least one of said plurality of normal datum has non-zero standard deviation;
    computing abnormal Gram-Schmidt vectors corresponding to observable abnormal values of a plurality of abnormal datum from said set of normal Gram-Schmidt coefficients;
    computing a signal to noise ratio for said abnormal Gram-Schmidt vectors to obtain abnormal predicted values; and
    using said abnormal predicted values for a future prediction.

2. The process of claim 1 further comprising the step of: computing dynamic signal to noise ratios for said normal Gram-Schmidt vectors and for said abnormal Gram-Schmidt vectors.

3. The process of claim 1 further comprising the step of: comparing said abnormal predicted values to said observable abnormal values of said plurality of abnormal datum.

4. The process of claim 1 wherein said observable abnormal values are assigned.

5. A process for multivariate data analysis comprising the steps of:
    using a computer in conjunction with a Gram-Schmidt orthogonalization process to determine normal Gram-Schmidt vectors defining a set of normal Gram-Schmidt coefficients corresponding to observable normal values of a plurality of normal datum where at least one of said plurality of normal datum has non-zero standard deviation;
    computing abnormal Gram-Schmidt vectors corresponding to observable abnormal values of a plurality of abnormal datum from said set of normal Gram-Schmidt coefficients;
    computing a signal to noise ratio for said abnormal Gram-Schmidt vectors to obtain abnormal predicted values;
    using said abnormal predicted values for a future prediction; and
    computing dynamic signal to noise ratios for said normal Gram-Schmidt vectors and for said abnormal Gram-Schmidt vectors;
    wherein said dynamic signal to noise ratio, $\eta_j$ is equivalent to:

$$\beta_j^2/V_e \quad (13)$$

where $$\beta_j = \left[\sum_{i=1}^{t} M_i\, U_{ij}\right]\Big/ r,$$

$M_i$ is the $i^{th}$ value of said plurality of abnormal datum, $U_{ij}$ is selected from the group consisting of: said normal Gram-Schmidt vectors and said abnormal Gram-Schmidt vectors, $V_e$ is $$\left(\sum_{i=1}^{t} U_{ij}^2 - (1/r)\left[\sum_{i=1}^{t} M_i U_{ij}\right]^2\right)\Big/(t-1)$$

where i is an integer between 1 and t, and j is an integer between 1 and k.

6. A process for multivariate data analysis comprising the steps of:
    using a computer in conjunction with a Gram-Schmidt orthogonalization process to determine normal Gram-Schmidt vectors defining a set of normal Gram-Schmidt coefficients corresponding to observable normal values of a plurality of normal datum where at least one of said plurality of normal datum has non-zero standard deviation;

computing abnormal Gram-Schmidt vectors corresponding to observable abnormal values of a plurality of abnormal datum from said set of normal Gram-Schmidt coefficients;

computing a signal to noise ratio for said abnormal Gram-Schmidt vectors to obtain abnormal predicted values; and using said abnormal predicted values for a future prediction;

wherein said observations on k variables relates to medical diagnosis.

7. A process for multivariate data analysis comprising the steps of:

using a computer in conjunction with a Gram-Schmidt orthogonalization process to determine normal Gram-Schmidt vectors defining a set of normal Gram-Schmidt coefficients corresponding to observable normal values of a plurality of normal datum where at least one of said plurality of normal datum has non-zero standard deviation;

computing abnormal Gram-Schmidt vectors corresponding to observable abnormal values of a plurality of abnormal datum from said set of normal Gram-Schmidt coefficients;

computing a signal to noise ratio for said abnormal Gram-Schmidt vectors to obtain abnormal predicted values;

using said abnormal predicted values for a future prediction;

wherein said observations on k variables relates to quality of a manufactured product.

8. A process for multivariate data analysis comprising the steps of:

using a computer in conjunction with a Gram-Schmidt orthogonalization process to determine normal Gram-Schmidt vectors defining a set of normal Gram-Schmidt coefficients corresponding to observable normal values of a plurality of normal datum where at least one of said plurality of normal datum has non-zero standard deviation;

computing abnormal Gram-Schmidt vectors corresponding to observable abnormal values of a plurality of abnormal datum from said set of normal Gram-Schmidt coefficients;

computing a signal to noise ratio for said abnormal Gram-Schmidt vectors to obtain abnormal predicted values;

using said abnormal predicted values for a future prediction;

wherein said observations on k variables relates to financial markets.

9. A process for multivariate data analysis comprising the steps of:

using a computer in conjunction with a Gram-Schmidt orthogonalization process to determine normal Gram-Schmidt vectors defining a set of normal Gram-Schmidt coefficients corresponding to observable normal values of a plurality of normal datum where at least one of said plurality of normal datum has non-zero standard deviation;

computing abnormal Gram-Schmidt vectors corresponding to observable abnormal values of a plurality of abnormal datum from said set of normal Gram-Schmidt coefficients;

computing a signal to noise ratio for said abnormal Gram-Schmidt vectors to obtain abnormal predicted values;

using said abnormal predicted values for a future prediction;

wherein said observations on k variables relates to voice recognition.

10. A process for multivariate data analysis comprising the steps of:

using a computer in conjunction with a Gram-Schmidt orthogonalization process to determine normal Gram-Schmidt vectors defining a set of normal Gram-Schmidt coefficients corresponding to observable normal values of a plurality of normal datum where at least one of said plurality of normal datum has non-zero standard deviation;

computing abnormal Gram-Schmidt vectors corresponding to observable abnormal values of a plurality of abnormal datum from said set of normal Gram-Schmidt coefficients;

computing a signal to noise ratio for said abnormal Gram-Schmidt vectors to obtain abnormal predicted values;

using said abnormal predicted values for a future prediction;

wherein said observations on k variables relates to TV picture recognition.

11. A process for multivariate analysis comprising the steps of:

using a computer to calculate Gram-Schmidt orthogonal vectors satisfying the equation:

$$U_1=(u_{11}, u_{12}, \ldots, u_{1n})$$

$$U_2=(u_{21}, u_{22}, \ldots, u_{2n})$$

$$U_k=(u_{k1}, u_{k2}, \ldots, u_{kn})$$

for a sample size n and observations on k variables, wherein the mean of said Gram-Schmidt orthogonal vectors is zero;

calculating for each of said Gram-Schmidt vectors a standard deviation, where at least one of said Gram-Schmidt vectors has a non-zero standard deviation; and calculating a Mahalanobis distance corresponding to each of the k observations that satisfies the equation:

$$MD_j=(1/k)[(u_{1j}^2/s_1^2)+(u_{2j}^2/s_2^2)+ \ldots +(u_{kj}^2/s_k^2)]$$

where j is an integer from 1 ... n.

12. The process of claim 11 further comprising creating a Mahalanobis space database comprising Gram-Schmidt vector means, Gram-Schmidt standard deviations, Gram-Schmidt coefficients, and Mahalanobis distances corresponding to the k observations.

13. The process of claim 11 wherein said observations on k variables relates to medical diagnosis.

14. The process of claim 11 wherein said observations on k variables relates to quality of a manufactured product.

15. The process of claim 11 wherein said observations on k variables relates to financial markets.

16. The process of claim 11 wherein said observations on k variables relates to voice recognition.

17. The process of claim 11 wherein said observations on k variables relates to TV picture recognition.

* * * * *